(12) United States Patent  
Saka

(10) Patent No.: US 10,288,158 B2  
(45) Date of Patent: May 14, 2019

(54) FLUID TRANSMISSION DEVICE FOR VEHICLE

(71) Applicant: Mazda Motor Corporation, Aki-gun, Hiroshima (JP)

(72) Inventor: Tokimori Saka, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 313 days.

(21) Appl. No.: 15/198,463

(22) Filed: Jun. 30, 2016

(65) Prior Publication Data

US 2017/0002908 A1 Jan. 5, 2017

(30) Foreign Application Priority Data

Jul. 3, 2015 (JP) .................................. 2015-134236  
Jul. 10, 2015 (JP) .................................. 2015-138908  
Sep. 10, 2015 (JP) .................................. 2015-178749

(51) Int. Cl.
| | |
|---|---|
| *F16F 15/14* | (2006.01) |
| *F16H 41/24* | (2006.01) |
| *F16H 45/02* | (2006.01) |
| F16D 25/0638 | (2006.01) |

(52) U.S. Cl.  
CPC ........... *F16H 45/02* (2013.01); *F16F 15/145* (2013.01); *F16H 41/24* (2013.01); *F16D 25/0638* (2013.01); *F16H 2045/0263* (2013.01)

(58) Field of Classification Search  
None  
See application file for complete search history.

(56) References Cited

U.S. PATENT DOCUMENTS

| 9,683,644 B2 * | 6/2017 | Smith ..................... F16D 33/18 |
| 10,024,410 B2 * | 7/2018 | Dinger .................. F16F 15/145 |
| 10,030,740 B2 * | 7/2018 | Tomiyama .............. F16H 45/02 |
| 2017/0307047 A1 * | 10/2017 | Rentfrow .......... F16F 15/12326 |
| 2017/0335937 A1 * | 11/2017 | Depraete ................. F16H 45/02 |
| 2018/0142760 A1 * | 5/2018 | Kojima ................. F16F 15/134 |

FOREIGN PATENT DOCUMENTS

| JP | H08226522 A | 9/1996 |
| JP | 2011208805 | 10/2011 |
| JP | 2012077827 A | 4/2012 |
| JP | 2015121235 | 7/2015 |

* cited by examiner

*Primary Examiner* — Jacob S. Scott  
(74) *Attorney, Agent, or Firm* — Alleman Hall Creasman & Tuttle LLP

(57) ABSTRACT

A fluid transmission device is provided. The device comprises a rotatable case having a rotational axis, coupled to a drive source, and provided therein with a pump shell for integrally rotating with the case and a turbine shell facing the drive source side of the pump shell, a drive force being transmitted between the pump shell and the turbine shell via fluid, and a dynamic vibration absorber having a swing body and for reducing vibration caused by the drive source. The dynamic vibration absorber overlaps with at least one of the pump shell and the turbine shell in an axial direction of the case.

7 Claims, 20 Drawing Sheets

FLUID TRANSMISSION DEVICE FOR VEHICLE

CROSS REFERENCE TO RELATED APPLICATIONS

This application claims priority to Japanese patent applications JP2015-134236 filed on Jul. 3, 2015, JP2015-138908 filed on Jul. 10, 2015, and JP2015-178749 filed on Sep. 10, 2015. The entire contents of all of these applications are hereby incorporated by reference for all purposes.

BACKGROUND

The present invention relates to a fluid transmission device of a transmission to be mounted on a vehicle, particularly to a fluid transmission device which includes a dynamic vibration absorber, and falls under a technical field of a transmission for a vehicle.

Fluid transmission devices incorporated in a transmission, such as an automatic transmission or a continuously variable transmission mounted on a vehicle, for transmitting an output of an engine to a transmission mechanism, has a case coupled to an output shaft of the engine. The case accommodates a pump shell for rotating integrally with the case, and a turbine shell facing the pump shell. A drive force is transmitted between the turbine shell and the pump shell via fluid.

One type of such fluid transmission devices that is generally known includes a lockup clutch for directly coupling a pump shell side and a turbine shell side to each other, so as to improve a fuel economy of the engine.

Another type of such fluid transmission devices that is known includes a centrifugal pendulum-type damper as a dynamic vibration absorber for reducing vibration, so as to reduce torsional vibration of a drive system caused by a torque variation of the engine. For example, JP2012-077827A discloses a fluid transmission device including a centrifugal pendulum-type damper fixed to an output member for transmitting an engine output to a transmission mechanism side.

However, with the fluid transmission device described in JP2012-077827A, the centrifugal pendulum-type damper as the dynamic vibration absorber is enlarged in an axial direction thereof since it is disposed on an engine side of the pump and turbine shells of the device. Therefore, a size reduction in the axial direction is desired for a compact configuration.

Particularly with a fluid transmission device incorporated in a transversely-placed transmission having an axis extending in a width direction of the vehicle, if the axial dimension of the device is enlarged, the axial dimension of the entire transmission also becomes enlarged, which easily leads to interference with a frame member of a chassis, for example. Therefore, a size reduction in the axial direction is desired for a compact configuration.

SUMMARY

The present invention is made in view of the above issues and aims to provide a fluid transmission device, which includes a dynamic vibration absorber that has a compact configuration in an axial direction thereof.

For addressing the above issues, the present invention is characterized by being configured as follows.

According to one aspect of the present invention, a fluid transmission device is provided. The device includes a rotatable case having a rotational axis, coupled to a drive source, and provided therein with a pump shell configured to integrally rotate with the case, and a turbine shell facing a drive source side of the pump shell, a drive force being transmitted between the pump shell and the turbine shell via fluid, and a dynamic vibration absorber having a swing body configured to reduce vibration caused by the drive source. The dynamic vibration absorber overlaps with at least one of the pump shell and the turbine shell in an axial direction of the case. This achieves the potential advantage of configuring the device more compactly in the axial direction.

According to one aspect of the present invention, a fluid transmission device is provided. The device includes a rotatable case having a rotational axis, coupled to a drive source, and provided therein with a pump shell configured to integrally rotate with the case, and a turbine shell facing a drive source side of the pump shell, a drive force being transmitted between the pump shell and the turbine shell via fluid, and a dynamic vibration absorber having a swing body configured to reduce vibration caused by the drive source. The dynamic vibration absorber overlaps with at least one of the pump shell and the turbine shell in an axial direction of the case. This achieves the potential advantage of configuring the device more compactly in the axial direction.

In a first aspect, a bulging part of the pump shell bulges away from the drive source as the pump shell extends circumferentially inward from the outer-most circumferential part thereof, and the case is coupled to the bulging part. This achieves the potential advantage of effectively reducing vibration.

In the first aspect, the device further comprises a lockup clutch that directly couples the pump shell and the turbine shell to each other, and damper springs that reduce the vibration caused by the drive source when the lockup clutch is engaged. The damper springs are disposed on an outer circumferential side of the lockup clutch to overlap with the lockup clutch in the axial direction, and also disposed on the drive source side of the dynamic vibration absorber to overlap with the dynamic vibration absorber in radial directions of the case. This achieves the potential advantage of configuring the device more compactly in the radial and axial directions.

In the first aspect, the dynamic vibration absorber is configured inside the case, and the dynamic vibration absorber is disposed on an outer circumferential side of the pump shell and the turbine shell. This achieves the potential advantage of configuring the device more compactly in the axial direction.

In the second aspect, an extension part extending on the outer circumferential side of the turbine shell is configured on an outer-most circumferential part of the pump shell, and the dynamic vibration absorber is coupled to an outer circumferential side of the extension part. This achieves the potential advantage of effectively reducing vibration.

In the third aspect, an extension part extending on an outer circumferential side of an outer-most circumferential part of the pump shell is configured on an outer-most circumferential part of the turbine shell, and the dynamic vibration absorber is coupled to an outer circumferential side of the extension part. This achieves the potential advantage of effectively reducing vibration.

In the fourth aspect, the dynamic vibration absorber is configured on the case, and the dynamic vibration absorber is disposed on the outer circumferential side of the pump shell and the turbine shell. This achieves the potential advantage of effectively reducing vibration.

In the fourth aspect, the device further comprises damper springs that reduce the vibration caused by the drive source when the lockup clutch is engaged, and the damper springs are disposed on an outer circumferential side of the lockup clutch to overlap with the dynamic vibration absorber in radial directions of the case. This achieves the potential advantage of configuring the device more compactly in the radial and axial directions.

In the fourth aspect, the dynamic vibration absorber is attached to an inner circumferential surface of the case.

In the fifth aspect, the dynamic vibration absorber is attached to an outer circumferential surface of the case. This achieves the potential advantage of reducing the space required for the fluid to fill the inside of the case, thereby reducing the total weight of the device.

In the sixth aspect, the pump shell is included in a pump and the turbine shell is included in a turbine. The pump includes a pump core ring that supports a plurality of blades, and the turbine includes a turbine core ring that supports a plurality of blades. Each of the pump core ring and the turbine core ring has an inside surface, the inside surfaces face each other and are concaved opening towards each other, and a core space is formed between the inside surfaces. The dynamic vibration absorber is at least partially positioned inside the core space. This achieves the potential advantage of configuring the device more compactly in the axial direction.

In the sixth aspect, part of the inside surface of at least one of the pump core ring and the turbine core ring is an annular-shaped plane extending perpendicularly to the rotational axis, and the dynamic vibration absorber is attached to the annular-shaped plane. This achieves the potential advantage of securing a larger space for the dynamic vibration absorber to move.

In the sixth aspect, each of the pump core ring and the turbine core ring has an inner circumferential part extending circumferentially inward while directly facing each other. This achieves the potential advantage of securing a larger space for the dynamic vibration absorber to move.

DETAILED DESCRIPTION OF EMBODIMENTS

Hereinafter, embodiments of the present invention are described with reference to the appended drawings.

Figure 1:
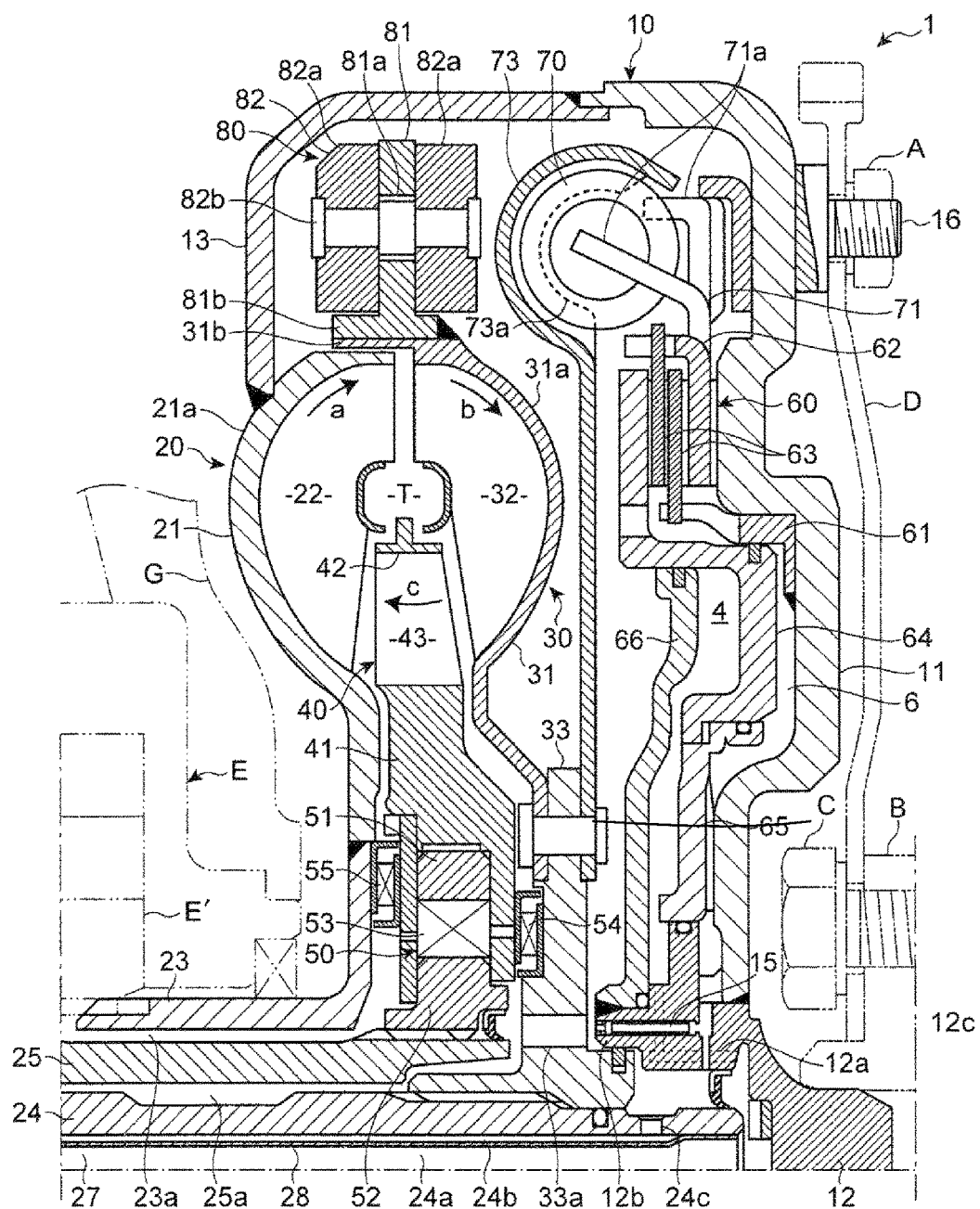
FIG. 1 is a cross-sectional view of a fluid transmission device according to a first embodiment of the present invention.
Figure 2:
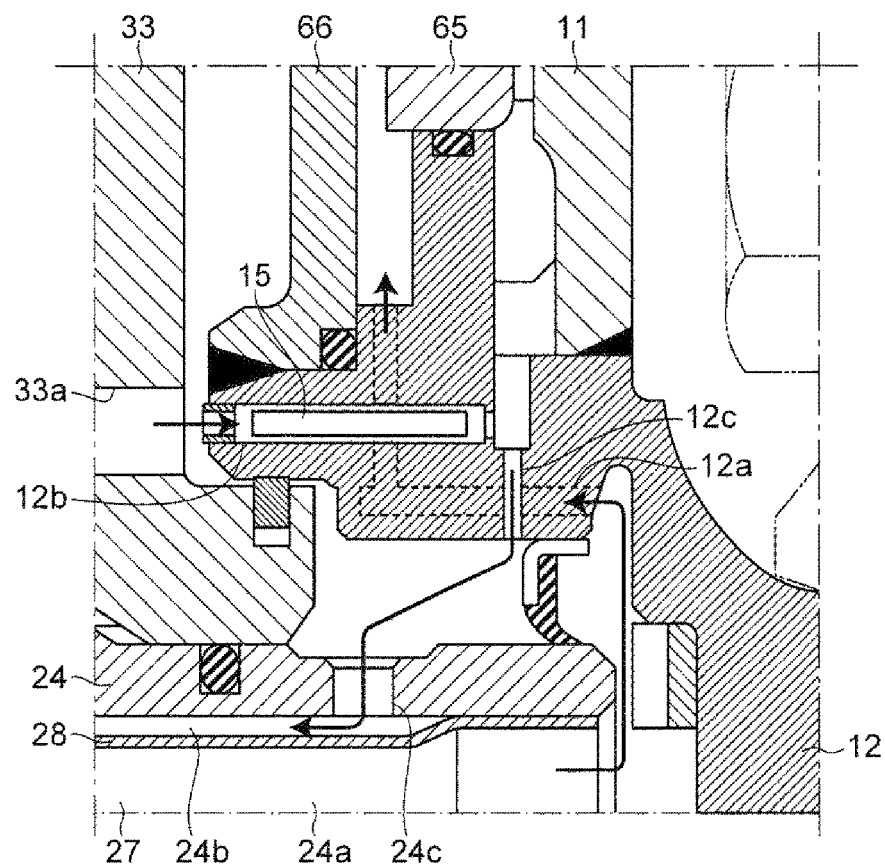
FIG. 2 is an enlarged cross-sectional view of a substantial part of the fluid transmission device illustrated in FIG. 1.

Below, an embodiment in which the present invention is applied to a torque converter of an automatic transmission is described. FIG. 1 is a cross-sectional view of a fluid transmission device according to a first embodiment of the present invention. FIG. 2 is an enlarged cross-sectional view of a substantial part of the fluid transmission device illustrated in FIG. 1. A torque converter 1 of this embodiment is incorporated as a fluid transmission device in an automatic transmission and, as illustrated in FIG. 1, has a rotatable case 10 forming an outer shell of the torque converter 1.

The case 10 is attached to an outer circumferential part of a drive plate D by a plurality of stud bolts 16 that are fixedly provided on an outer circumferential part of a front cover 11 forming an engine-side (i.e., drive source side) surface of the case 10, and nuts A for being engaged with the stud bolts 16, respectively. The drive plate D is attached to an end part of a crankshaft B of the engine by using a crank bolt C. Thus, the torque converter 1 is entirely coupled to the crankshaft B so as to be driven by the engine. It will be noted that henceforth, in the following description, the engine side (right side of the drawings) shall be referred to as the front side, such that a direction toward the engine side shall be referred to as the forward direction, and an opposite side from the engine (left side of the drawings) shall be referred to as the rear side, such that a direction away from the engine shall be referred to as the rearward direction.

The torque converter 1 includes, as its main components, a pump 20, a turbine 30, a stator 40, a one-way clutch 50, a lockup clutch 60, and a damper spring 70. These components are accommodated inside the case 10, and oil is filled inside the case 10 as drive force transmission fluid.

The pump 20 comprises a pump shell 21 coupled to a rear cover 13 forming a rear surface of the case 10, and multiple blades 22 are disposed at predetermined intervals in a circumferential direction of the pump 20, inside a curved part 21a provided on an outer circumferential part of the pump shell 21 and bulging rearward. It will be noted that the rear cover 13 is coupled to a position of the pump shell 21 bulging rearward as the pump shell 21 extends circumferentially inward from its outer-most circumferential part.

Further, the pump 20 integrally rotates with the case 10, and thus, the oil filling the case 10 is guided by the blades 22 and an inside surface of the curved part 21a to cause a flow "a" of the oil oriented forward while revolving about a rotational axis of the case 10.

Moreover, the pump 20, specifically an inner circumferential end part of the pump shell 21, is coupled to a pump sleeve 23 extending to a transmission mechanism side (rear side) therefrom, and a tip part of the pump sleeve 23 is engaged with an inner gear E' of a gear oil pump E disposed on the rear side of the torque converter 1. Thus, the oil pump E is driven by the rotation of the crankshaft B via the case 10, the pump shell 21, and the pump sleeve 23.

The turbine 30 comprises a turbine shell 31 having, in an outer circumferential part of the turbine 30, a curved part 31a curving to the opposite side from the curved part 21a of the pump shell 21, multiple blades 32 disposed inside the curved part 31a of the turbine shell 31 at predetermined intervals in a circumferential direction of the turbine 30, and a turbine hub 33 coupled to an inner circumferential end part of the turbine shell 31 by rivets. The turbine 30 is set opposite to the front side of the pump 20, and is accommodated inside the case 10 to be rotatable.

Further, the curved part 31a, where the blades 32 of the turbine shell 31 are disposed, and the curved part 21a, where the blades 22 of the pump shell 21 are disposed, are opposite to each other. Thus, a flow "a" caused by the rotation of the pump 20 is introduced into the curved part 31a of the turbine shell 31, a flow "b" oriented circumferentially inward is formed by an inside surface of the curved part 31a and the blades 32, and the flow "b" pushes the blades 32. Thus, the turbine 30 receives a force in its circumferential direction and is driven in the same direction as the pump 20.

This drive force is transmitted to the transmission mechanism by a turbine shaft 24 coupled to the turbine 30, the turbine shaft 24 extending to the transmission mechanism side of the automatic transmission. An inner circumferential end part of the turbine hub 33 is spline-fitted to the turbine shaft 24, and thus, the turbine 30 is coupled to the turbine shaft 24.

The stator 40 is disposed between the opposing parts of the pump 20 and the turbine 30 and integrated as a whole by having multiple blades 43 extending radially between an inner ring part 41 and an outer ring part 42 and disposed at predetermined intervals in a circumferential direction of the stator 40. The blades 43 are disposed between an inner circumferential end part of the blades 22 of the pump 20 and an inner circumferential end part of the blades 32 of the turbine 30. Thus, after driving the turbine 30, the flow "b" of the fluid is introduced from the turbine 30 side to form a flow "c" passing through between the blades 43.

This flow "c" is introduced into the curved part 21a of the pump shell 21 from the inner circumferential side to be the flow "a", and thus, a flow circulating through between the blades 22, 32 and 43 of the pump 20, the turbine 30 and the stator 40, respectively, is formed, and doughnut-shaped space forming this circulation path for the entire torque converter 1, i.e., a torus T, is formed.

The one-way clutch 50 supports the stator 40 to realize a torque increase by the stator 40, and is disposed on the inner circumferential side of the stator 40. The one-way clutch 50 has an outer race 51, an inner race 52, and a plurality of sprags 53 interposed between both races 51 and 52. An inner circumferential surface of the inner ring part 41 of the stator 40 is spline-fitted by press-fitting onto an outer circumferential surface of the outer race 51, and an inner circumferential surface of the inner race 52 is spline-fitted onto a stator shaft 25 extending from a transmission case G of the automatic transmission, so that the inner race 52 is assembled onto the stator shaft 25.

It will be noted that the axial position of the one-way clutch 50 is regulated by a thrust bearings 54 which is disposed between the one-way clutch 50 and the turbine hub 33 that is positioned on the front side of the one-way clutch 50, and by the thrust bearing 55 which is disposed between the one-way clutch 50 and the pump sleeve 23 that is coupled to the pump shell 21 and positioned on the rear side of the one-way clutch 50. Thus, the stator 40 is positioned relative to the pump 20 and the turbine 30 in the axial direction.

When a pushing force acts on the blades 43 from one side by the flow "c" and the stator 40 receives a rotational force in the corresponding direction, the one-way clutch 50 rotates idly and, thus, the stator 40 rotates freely. On the other hand, when a pushing force acts on the blades 43 from the other side and the stator 40 receives a rotational force in the other direction, the one-way clutch 50 locks itself and, thus, the stator 40 is fixed. Here, torque increase is effected when the torque inputted from the engine to the pump 20 is increased, and the torque is then outputted from the turbine 30 to the turbine shaft 24.

The oil to be supplied to the torus T is first supplied into the case 10 through an oil path 25a formed between the stator shaft 25 and the turbine shaft 24. The oil further passes through an oil path 33a formed in the turbine hub 33 and supplied to a space where the lockup clutch 60 is disposed. The oil is also supplied to the torus T by passing between the pump shell 21 and the turbine shell 31.

Further, the oil supplied to the torus T circulates by passing between the blades 22, 32 and 43 of the pump 20, the turbine 30, and the stator 40, respectively, and part of the oil is discharged from the case 10 through an oil path 23a that is formed between the pump sleeve 23 and the stator shaft 25.

The lockup clutch 60 directly couples the pump shell 21 and the turbine shell 31 to each other and includes a clutch hub 61 and a clutch drum 62 disposed substantially coaxially, a plurality of friction plates 63 disposed between the clutch hub 61 and the clutch drum 62 and alternately engaged therewith, respectively, and a piston 64 configured to push the plurality of friction plates 63. The clutch hub 61 is fixedly attached to an inside surface of the front cover 11 by welding.

Further, an oil path component 65 is fixedly attached to an inner circumferential part of the front cover 11 by welding. The oil path component 65 extends along the front cover 11 in radial directions of the case 10, at a position that is on an outer circumferential side of a coupling member 12 coupled to the crankshaft B, and is on the inner circumferential side of the clutch hub 61. The piston 64 is slidably fitted to the oil path component 65 and the clutch hub 61 therebetween. It will be noted that the oil path component 65 is welded to the front cover 11, for example, at a plurality of positions in a circumferential direction of the case 10.

The lockup clutch 60 further includes a plate member 66 disposed on the rear side of the piston 64 and fixedly attached to the coupling member 12, and an oil pressure chamber 4, into which oil pressure for engaging the lockup clutch 60 (hereinafter, engaging oil pressure) is applied, is formed between the piston 64 and the plate member 66.

As illustrated in FIG. 2, when the oil pressure chamber 4 is supplied with the oil at a predetermined engaging oil pressure through an oil path 12a formed in the coupling member 12 from an oil path 24a formed inside the turbine shaft 24, the plurality of friction plates 63 are pushed against the front cover 11 by the piston 64, and the lockup clutch 60 is engaged.

The lockup clutch 60 is further formed with a balance chamber 6 between the piston 64 and the case 10, specifically the front cover 11. The balance chamber 6 is formed on an opposite side from the oil pressure chamber 4 with respect to the piston 64, and cancels a centrifugal force acting on the oil inside the oil pressure chamber 4, by using a centrifugal force acting on oil introduced into the balance chamber 6.

Part of the oil supplied from the oil path 25a, which is formed between the stator shaft 25 and the turbine shaft 24, and passed through the oil path 33a formed in the turbine hub 33, is introduced into the balance chamber 6 through an oil path 12b formed in the coupling member 12 and extending in the axial direction. The oil path 12b is provided with an annular gap throttle formed by a cylindrical body 15 inserted into the oil path 12b.

The balance chamber 6 also communicates with an oil path 24b formed inside the turbine shaft 24 and located on an outer circumferential side therein, through an oil path 12c formed in the coupling member 12 and extending in a radial direction of the case 10 and a communication hole 24c penetrating the turbine shaft 24 in the radial direction. Thus, the oil inside the balance chamber 6 is discharged through the oil path 12c and the communication hole 24c.

Inside the turbine shaft 24, an oil hole 27 penetrating the turbine shaft 24 in the axial direction is formed, and the oil hole 27 is partitioned into the inner oil path 24a communicating with the oil pressure chamber 4 and the outer oil path 24b communicating with the balance chamber 6, by a pipe member 28 fitted into the oil hole 27.

The damper spring 70 elastically deforms in the rotating direction of the case 10 when the lockup clutch 60 is engaged so as to reduce vibration caused by the drive source, and the damper spring 70 is disposed on an outer circumferential side of the lockup clutch 60 to overlap therewith in the axial direction. The damper spring 70 is provided at a plurality of positions at even intervals in the circumferential direction of the case 10.

Each damper spring 70 is supported in its circumferential direction by spring receiving parts 71a that are provided onto a spring receiving member 71 that is integrally formed with the clutch drum 62 and extended circumferentially outward from the clutch drum 62, and also by a spring receiving part 73a provided onto a spring holding plate 73 for holding an outer circumferential side of the damper spring 70. The damper spring 70 couples the spring receiving member 71 to the spring holding plate 73 elastically in the rotating direction.

Further, an inner circumferential end part of the spring holding plate 73 is coupled to the turbine hub 33 by a rivet, and when the lockup clutch 60 is engaged, the rotation on the pump shell 21 side, in other words, the rotation of the crankshaft B, is inputted to the spring receiving member 71 through the lockup clutch 60, further passes through the damper spring 70, and then is transmitted from the spring holding plate 73 to the turbine shell side, specifically the turbine hub 33. The damper spring 70 preferably has a large torsion angle and has low rigidity.

The torque converter 1 further includes, inside the case 10, a centrifugal pendulum-type damper 80 as a dynamic vibration absorber having a swing body for reducing the vibration caused by the drive source. The pendulum-type damper 80 is disposed on the outer circumferential side of the pump shell 21 and the turbine shell 31 to overlap with the pump shell 21 and the turbine shell 31 in the axial direction. The pendulum-type damper 80 is provided at a plurality of positions in the circumferential direction of the case 10.

Each pendulum-type damper 80 has an annular-shaped plate member 81 as a supporting body and, as the swing body capable of swinging with respect to the supporting body, a mass member 82 swingably supported by the plate member 81. The mass member 82 is swingably supported by an arc-shaped guide hole 81a which is formed in the plate member 81 to extend in the circumferential direction of the case 10.

The mass member 82 has two plates 82a formed into a circular disk shape and a substantially cylindrically shaped coupling part 82b for coupling the two plates 82a to each other. By inserting the coupling part 82b into the guide hole 81a of the plate member 81 in a state where the plate member 81 is disposed between the two plates 82a, the mass member 82 is swingably supported by the plate member 81.

In the torque converter 1, an extension part 31b extending on the outer circumferential side of the outer-most circumferential part of the pump shell 21 is provided on an outer-most circumferential part of the turbine shell 31. The pendulum-type damper 80 is coupled to an outer circumferential side of the extension part 31b by welding the extension part 31b of the turbine shell 31 to an annular-shaped flange part 81b provided on an inner-circumferential end part of the plate member 81 and extending in the axial direction.

By coupling the pendulum-type damper 80 to the turbine shell 31 as described above, when the drive force is transmitted from the case 10 through the turbine hub 33 coupled to the turbine shell 31, the pendulum-type damper 80 can reduce the vibration caused by the engine. By utilizing the swing of the mass member 82, the pendulum-type damper 80 can reduce the vibration not only at an engine speed corresponding to a predetermined resonance frequency, but also at other engine speeds.

As described above, the pendulum-type damper 80 is disposed on the outer circumferential side of the pump shell 21 and the turbine shell 31 to overlap with the pump shell 21 and the turbine shell 31 in the axial direction. The damper spring 70 is disposed on the front side of the pendulum-type dampers 80 to overlap with one of the pendulum-type dampers 80 in a radial direction of the case 10.

Next, the operation of the torque converter 1 is described. When the lockup clutch 60 is not engaged, the engine output is transmitted from the pump shell 21, which is coupled to the case 10 integrally rotating with the crankshaft B of the engine, to the turbine shell 31 via the oil circulating within the torus T, and transmitted to the transmission mechanism through the turbine hub 33 and the turbine shaft 24. Here, at a transmission ratio at which the torque increase effect of the stator 40 can be exerted, the output torque of the engine is increased and outputted to the transmission mechanism.

Further, when the lockup clutch 60 is engaged, which is when the predetermined engaging oil pressure is applied to the oil pressure chamber 4 of the lockup clutch 60, since the pump shell 21 is coupled to the turbine shell 31 via the lockup clutch 60, the engine output is transmitted from the front cover 11 of the case 10, which integrally rotates with the crankshaft B of the engine, to the lockup clutch 60, the damper springs 70, and the turbine hub 33 coupled to the turbine shell 31, and then further transmitted to the transmission mechanism through the turbine shaft 24. Here, since the engine output can be transmitted to the transmission mechanism without using the oil, compared to when the lockup clutch 60 is not engaged, torque transmission efficiency is improved and a fuel economy of the engine is also improved.

The pendulum-type damper 80 is attached to the turbine shell 31 coupled to the turbine hub 33 to which the drive force from the engine is transmitted, and in both states where the lockup clutch 60 is not engaged and is engaged, the pendulum-type damper 80 reduces the vibration caused by the engine.

In this embodiment, the pendulum-type damper 80, disposed on the outer circumferential side of the pump shell 21 and the turbine shell 31, overlaps with both of the pump shell 21 and the turbine shell 31 in the axial direction; however, the pendulum-type damper 80 may alternatively only overlap with one of the pump shell 21 and the turbine shell 31 in the axial direction.

As described above, with the fluid transmission device 1 of this embodiment, the dynamic vibration absorbers 80 for reducing the vibration caused by the drive source are provided, and each dynamic vibration absorber 80 is disposed on the outer circumferential side of the pump shell 21 and the turbine shell 31 to overlap with at least one of the pump shell 21 and the turbine shell 31 in the axial direction. Thus, compared to a configuration in which each dynamic vibration absorber does not overlap with the pump shell and the turbine shell in the axial direction, an axial dimension of the fluid transmission device is shortened, and the fluid transmission device can be configured compactly in the axial direction.

Further, the extension part 31b extending on the outer circumferential side of the outer-most circumferential part of the pump shell 21 is provided on the outer-most circumferential part of the turbine shell 31, and the dynamic vibration absorber 80 is coupled to the outer circumferential side of the extension part 31b. Thus, the dynamic vibration absorber 80 overlapping with at least one of the pump shell 21 and the turbine shell 31 in the axial direction can be stably supported, and the vibration reduction effect by the dynamic vibration absorber can be effectively exerted.

Moreover, the case 10 is coupled to the part of the pump shell 21 bulging rearward as the pump shell 21 extends circumferentially inward from its outer-most circumferential part. Thus, space can be secured to dispose the dynamic vibration absorbers 80 on the outer circumferential side of the pump shell 21 and the turbine shell 31.

Furthermore, the damper springs 70 are disposed on the outer circumferential side of the lockup clutch 60 to overlap therewith in the axial direction, and each damper spring 70 is disposed on the front side of the dynamic vibration absorbers 80 to overlap with one of the dynamic vibration absorbers 80 in a radial direction of the case 10. Thus, the lockup clutch 60 and the damper springs 70 can be configured compactly in the axial direction, and the damper springs 70 and the dynamic vibration absorbers 80 can be configured compactly in the radial direction. As a result, the fluid transmission device 1 can be configured compactly in both the axial and radial directions.

Figure 3:
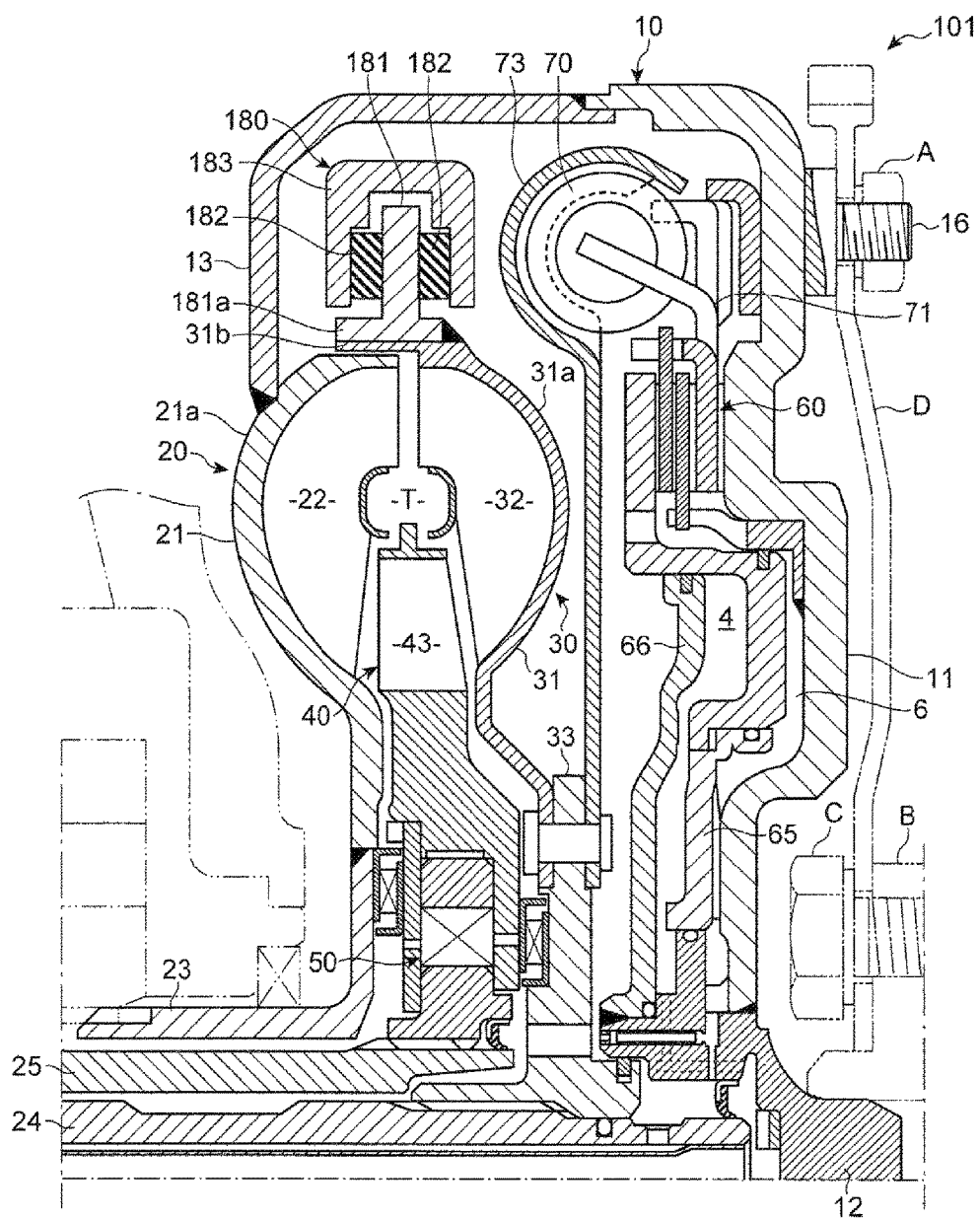
FIG. 3 is a cross-sectional view of a fluid transmission device according to a second embodiment of the present invention.

FIG. 3 is a cross-sectional view of a fluid transmission device according to a second embodiment of the present invention. Since the fluid transmission device 101 of the second embodiment is similar to the fluid transmission device 1 of the first embodiment except for the dynamic vibration absorber, the similar configurations are denoted with the same reference characters and the description thereof is omitted.

A torque converter 101 as the fluid transmission device of the second embodiment also includes, as illustrated in FIG. 3, a pump 20, a turbine 30, a stator 40, a one-way clutch 50, a lockup clutch 60, and damper springs 70. These components are accommodated inside a case 10 and oil is filled inside the case 10.

The torque converter 101 includes, inside the case 10, a dynamic-type damper 180 as a dynamic vibration absorber having a swing body for reducing vibration caused by the drive source. The dynamic-type damper 180 is disposed on an outer circumferential side of a pump shell 21 and a turbine shell 31 to overlap with the pump shell 21 and the turbine shell 31 in an axial direction of the case 10.

The dynamic-type damper 180 has an annular-shaped plate member 181 as a supporting body, annular-shaped elastic members 182 fixed to front and rear sides of the plate member 181, respectively, and made of, for example, rubber. As the swing body capable of swinging with respect to the supporting body, an annular-shaped mass member 183 has a substantially channel-shaped cross section to cover the plate member 181 and the elastic members 182 and fixed to the elastic members 182. The mass member 183 is swingably supported by the plate member 181 via the elastic members 182.

Also in the torque converter 101, an extension part 31b extending on the outer circumferential side of an outer-most circumferential part of the pump shell 21 is provided on an outer-most circumferential part of the turbine shell 31. The dynamic-type damper 180 is coupled to an outer circumferential side of the extension part 31b by welding an annular-shaped flange part 181a, which is provided on an inner circumferential end part of the plate member 181 extending in the axial direction, to the extension part 31b of the turbine shell 31.

By coupling the dynamic-type damper 180 to the turbine shell 31 as described above, when a drive force is transmitted from the case 10 through a turbine hub 33 coupled to the turbine shell 31, the dynamic-type damper 180 can reduce the vibration caused by the engine. By the swing of the mass member 183, the dynamic-type damper 180 can reduce the vibration at an engine speed corresponding to a predetermined resonance frequency.

Also in this embodiment, the dynamic-type damper 180 is disposed on the outer circumferential side of the pump shell 21 and the turbine shell 31 to overlap with at least one of the pump shell 21 and the turbine shell 31 in the axial direction. The damper springs 70 are disposed on a front side of the dynamic-type damper 180 to overlap therewith in radial directions of the case 10.

As described above, also with the fluid transmission device 101 of this embodiment, the dynamic vibration absorber 180 is provided for reducing the vibration caused by the drive source, and the dynamic vibration absorber 180 is disposed on the outer circumferential side of the pump shell 21 and the turbine shell 31 to overlap with at least one of the pump shell 21 and the turbine shell 31 in the axial direction. Thus, compared to a configuration in which the dynamic vibration absorber does not overlap with the pump shell and the turbine shell in the axial direction, an axial dimension of the fluid transmission device is shortened, and the fluid transmission device can be configured compactly in the axial direction.

Figure 4:
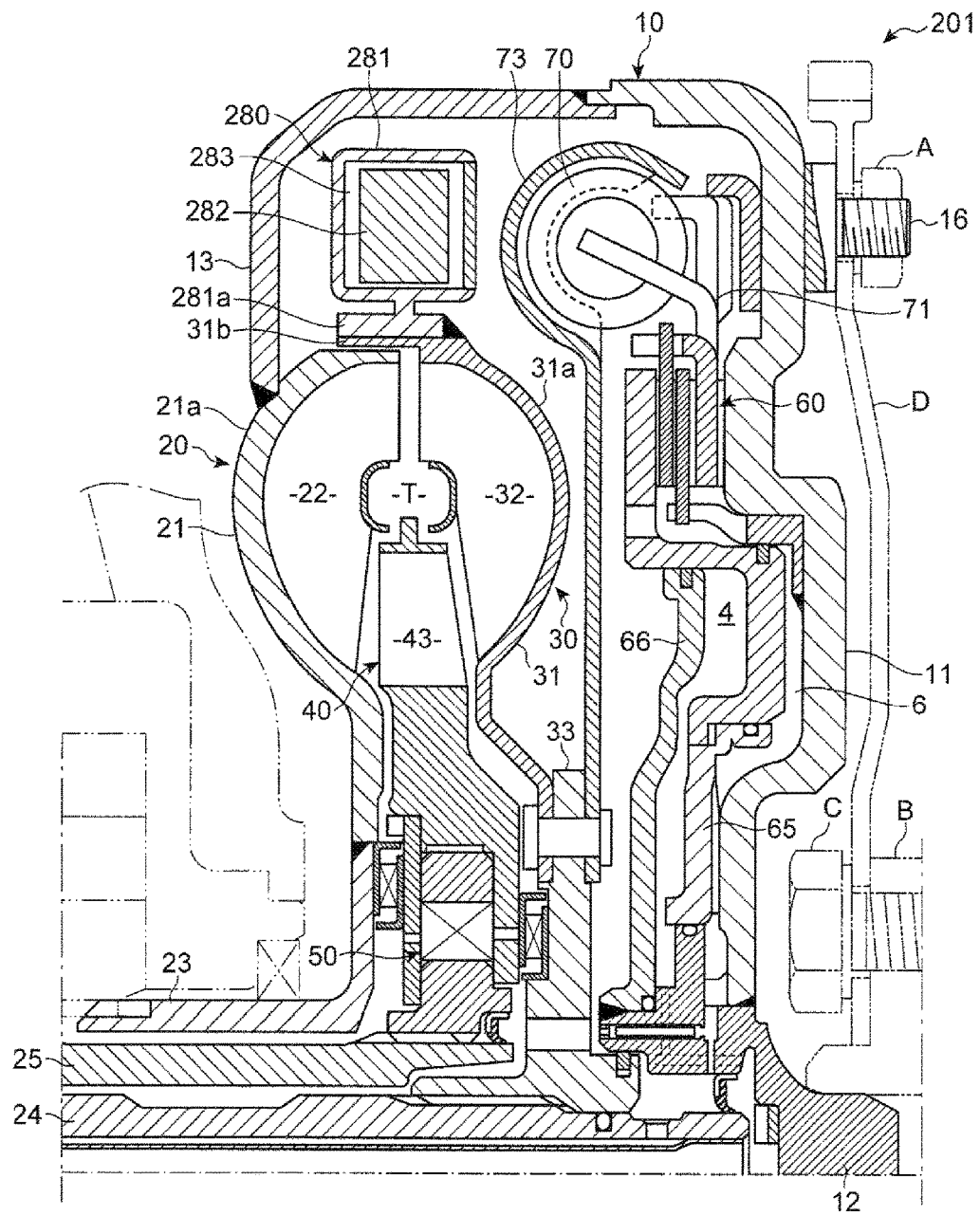
FIG. 4 is a cross-sectional view of a fluid transmission device according to a third embodiment of the present invention.

FIG. 4 is a cross-sectional view of a fluid transmission device according to a third embodiment of the present invention. Since the fluid transmission device 201 of the third embodiment is similar to the fluid transmission device 1 of the first embodiment except for the dynamic vibration absorber, the similar configurations are denoted with the same reference characters and the description thereof is omitted.

A torque converter 201 as the fluid transmission device of the third embodiment also includes, as illustrated in FIG. 4, a pump 20, a turbine 30, a stator 40, a one-way clutch 50, a lockup clutch 60, and damper springs 70. These components are accommodated inside a case 10 and oil is filled inside the case 10.

The torque converter 201 includes, inside the case 10, a viscous-type damper 280 as a dynamic vibration absorber having a swing body for reducing vibration caused by a drive source. The viscous-type damper 280 is disposed on an outer circumferential side of a pump shell 21 and a turbine shell 31 to overlap with the pump shell 21 and the turbine shell 31 in an axial direction of the case 10.

The viscous-type damper 280 has an annular-shaped casing 281 having a substantially-rectangular cross section as a supporting body and, as the swing body capable of swinging with respect to the supporting body, an annular-shaped mass member 282 is accommodated inside the casing 281. Viscous fluid, such as silicone oil, is enclosed in a gap 283 between the casing 281 and the mass member 282. The mass member 282 is swingably supported by the casing 281 via the viscous fluid.

Also in the torque converter 201, an extension part 31b extending on the outer circumferential side of an outer-most circumferential part of the pump shell 21 is provided on an outer-most circumferential part of the turbine shell 31. The viscous-type damper 280 is coupled to an outer circumferential side of the extension part 31b by welding an annular-shaped flange part 281a, which is provided on an inner circumferential end part of the casing 281 extending in the axial direction, to the extension part 31b of the turbine shell 31.

By coupling the viscous-type damper 280 to the turbine shell 31 as described above, when a drive force is transmitted from the case 10 through a turbine hub 33 coupled to the turbine shell 31, the viscous-type damper 280 can reduce the vibration caused by the engine. By utilizing the swing of the mass member 282, the viscous-type damper 280 can reduce the vibration at an engine speed corresponding to a predetermined resonance frequency.

Also in this embodiment, the viscous-type damper 280 is disposed on the outer circumferential side of the pump shell 21 and the turbine shell 31 to overlap with at least one of the pump shell 21 and the turbine shell 31 in the axial direction. The damper springs 70 are disposed on a front side of the viscous-type damper 280 to overlap therewith in radial directions of the case 10.

As described above, also with the fluid transmission device 201 of this embodiment, the dynamic vibration absorber 280 is provided for reducing the vibration caused by the drive source, and the dynamic vibration absorber 280 is disposed on the outer circumferential side of the pump shell 21 and the turbine shell 31 to overlap with at least one of the pump shell 21 and the turbine shell 31 in the axial direction. Thus, compared to a configuration in which the dynamic vibration absorber does not overlap with the pump shell and the turbine shell in the axial direction, an axial dimension of the fluid transmission device is shortened, and the fluid transmission device can be configured compactly in the axial direction.

Figure 5:
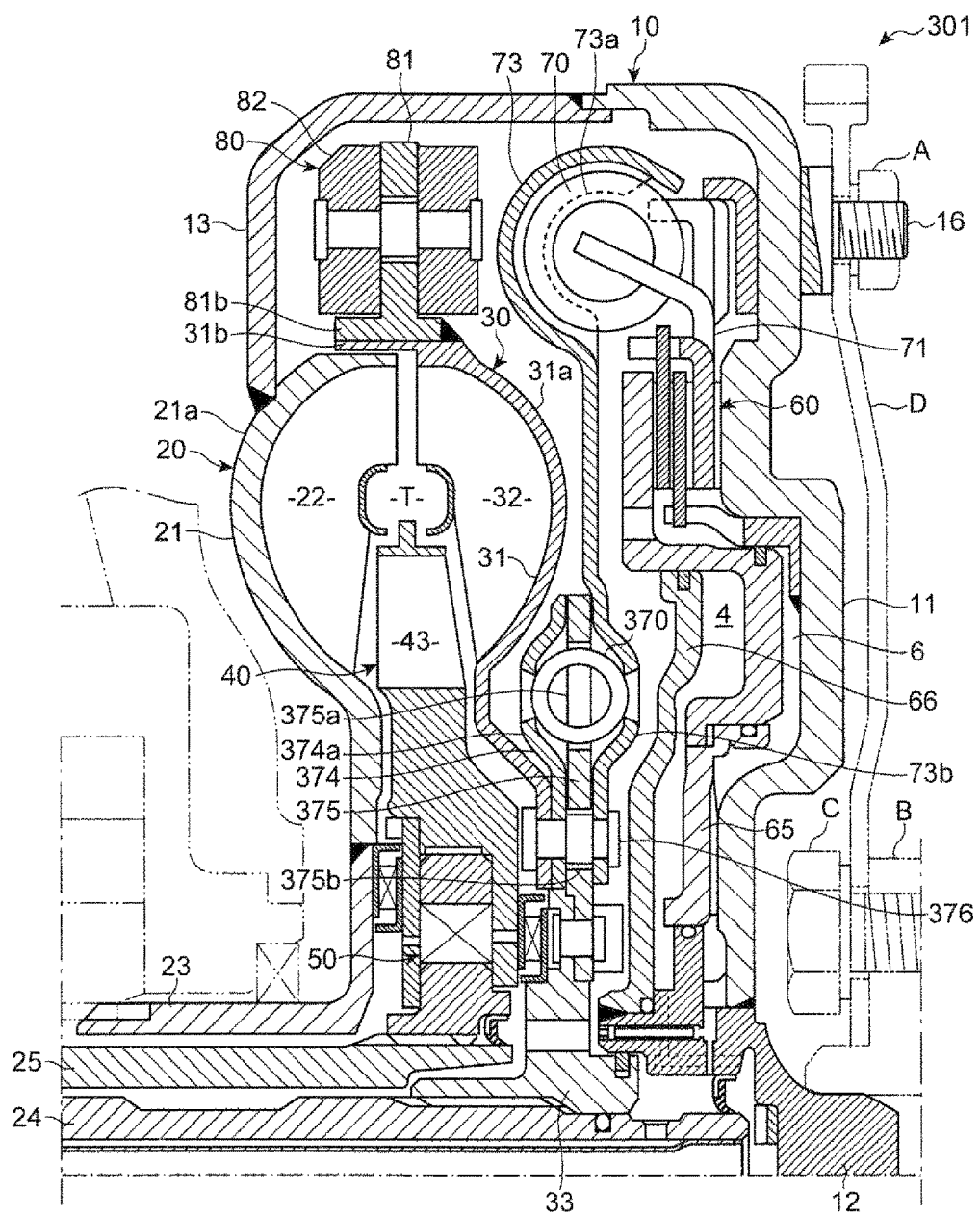
FIG. 5 is a cross-sectional view of a fluid transmission device according to a fourth embodiment of the present invention.

FIG. 5 is a cross-sectional view of a fluid transmission device according to a fourth embodiment of the present invention. Since the fluid transmission device 301 of the fourth embodiment is similar to the fluid transmission device 1 of the first embodiment except that when a drive force is transmitted from a drive source to a turbine hub 33, the drive force is transmitted by damper springs 70 and other damper springs, the similar configurations are denoted with the same reference characters and the description thereof is omitted.

A torque converter 301 as the fluid transmission device of the fourth embodiment also includes, as illustrated in FIG. 5, a pump 20, a turbine 30, a stator 40, a one-way clutch 50, a lockup clutch 60, and the damper springs 70. These components are accommodated inside a case 10 and oil is filled inside the case 10.

The torque converter 301 also includes, inside the case 10, a centrifugal pendulum-type damper 80 as a dynamic vibration absorber having a swing body for reducing vibration caused by the drive source. The pendulum-type damper 80 is disposed on an outer circumferential side of a pump shell 21 and a turbine shell 31 to overlap with the pump shell 21 and the turbine shell 31 in an axial direction of the case 10. The pendulum-type damper 80 is provided at a plurality of positions in the circumferential direction of the case 10.

The torque converter 301 further includes damper springs 370 provided between a side of the damper springs 70 and a side of the turbine hub 33 to align with the damper springs 70 in radial directions of the case 10, respectively, and having a higher torsion spring rigidity than the damper springs 70. Each damper spring 370 is disposed on an inner circumferential side of a corresponding damper spring 70 to overlap therewith in the axial direction. The torque converter 301 is provided with the damper springs 370 in addition to the damper springs 70 so as to achieve an even wider torsion angle and reduce even more the vibration caused by the drive system due to a torque variation of the engine compared to the configuration in which only the damper springs 70 are provided.

In the torque converter 301, a spring holding part 73b bulging forward is provided on an inner circumferential side of a spring holding plate 73, and a spring holding plate 374 having a spring holding part 374a bulging rearward opposes to the spring holder 73b, at a position on a rear side of the spring holding part 73b.

Each damper spring 370 is disposed between the front and rear spring holding plates 73 and 374, and both front and rear end parts of the damper spring 370 are supported by the front and rear spring holding plates 73 and 374, respectively. Further, the front and rear spring holding plates 73 and 374 are coupled by a rivet 376 along with the turbine shell 31.

A holding plate 375 is disposed between the front and rear spring holding plates 73 and 374. The holding plate 375 is provided with a spring receiving part 375a for receiving, at an outer circumferential position, the damper spring 370, and the holding plate 375 is also provided with an arc-shaped guide hole 375b extending in a circumferential direction of the case 10, at an inner circumferential position of the spring receiving part 375a. The rivet 376 is inserted into the guide hole 375b. Further, an inner circumferential end part of the holding plate 375 is coupled to the turbine hub 33 by a rivet.

With the torque converter 301 configured as described above, when the lockup clutch 60 is engaged, since the pump shell 21 and the turbine shell 31 are coupled to each other via the lockup clutch 60, the engine output is transmitted from a front cover 11 of the case 10 integrally rotating with a crankshaft B of the engine, to the turbine hub 33 through the lockup clutch 60, the damper springs 70 and 370, and the holding plate 375, and then further transmitted to a transmission mechanism through a turbine shaft 24.

Further, when the lockup clutch 60 is not engaged, the engine output is transmitted from the pump shell 21 coupled to the case 10, which integrally rotates with the crankshaft B of the engine, to the turbine shell 31 via the oil circulating within a torus T, and transmitted to the transmission mechanism through the turbine hub 33 and the turbine shaft 24 without passing through the lockup clutch 60.

In this embodiment, each pendulum-type damper 80 is attached to the turbine shell 31 coupled to the turbine hub 33 to which the drive force from the engine is transmitted, and in both states where the lockup clutch 60 is not engaged and is engaged, the pendulum-type damper 80 reduces the vibration caused by the engine.

As described above, also with the fluid transmission device 301 of this embodiment, the dynamic vibration absorbers 80 are provided for reducing the vibration caused by the drive source, and each dynamic vibration absorber 80 is disposed on the outer circumferential side of the pump shell 21 and the turbine shell 31 to overlap with the pump shell 21 and the turbine shell 31 in the axial direction. Thus, compared to a configuration in which each dynamic vibration absorber does not overlap with at least one of the pump shell and the turbine shell in the axial direction, an axial dimension of the fluid transmission device is shortened, and the fluid transmission device can be configured compactly in the axial direction.

In the first to fourth embodiments, the extension part 31b extending on the outer circumferential side of the outer-most circumferential part of the pump shell 21 is provided on the outer-most circumferential part of the turbine shell 31, and the dynamic vibration absorbers 80, 180 and 280 are coupled to the outer circumferential side of the extension part 31b. However, an extension part extending on the outer circumferential side of the outer-most circumferential part of the turbine shell 31 may alternatively be provided on the outer-most circumferential part of the pump shell 21, and the dynamic vibration absorbers 80, 180 and 280 may be coupled to an outer circumferential side of the extension part provided on the outer-most circumferential part of the pump shell 21.

As described above, even in the configuration in which the extension part extending on the outer circumferential side of the outer-most circumferential part of the turbine shell 31 is provided on the outer-most circumferential part of the pump shell 21, and the dynamic vibration absorber is coupled to the outer circumferential side of the extension part, stable support can be provided for the dynamic vibration absorber overlapping with at least one of the pump shell 21 and the turbine shell 31 in the axial direction.

In the first to fourth embodiments, the pendulum-type damper 80, the dynamic-type damper 180, and the viscous-type damper 280 are respectively used as the dynamic vibration absorber disposed on the outer circumferential side of the pump shell 21 and the turbine shell 31 to overlap with the pump shell 21 and the turbine shell 31 in the axial direction. However, other dynamic vibration absorbers may alternatively be used.

Figure 6:
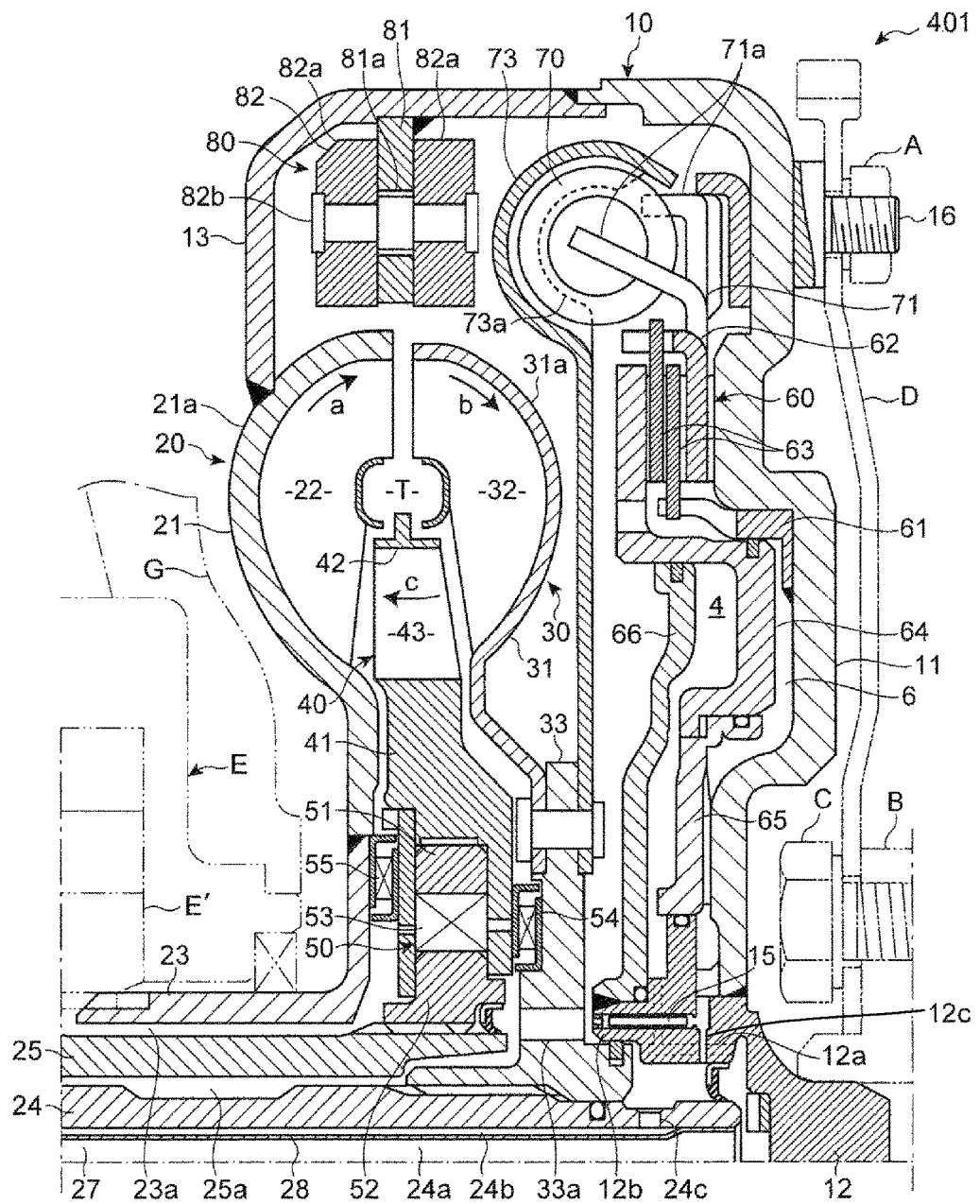
FIG. 6 is a cross-sectional view of a fluid transmission device according to a fifth embodiment of the present invention.

FIG. 6 is a cross-sectional view of a fluid transmission device according to a fifth embodiment of the present invention. Since the fluid transmission device 401 of the fifth embodiment is similar to the first embodiment except for the plate members 81 of the dynamic vibration absorbers, the similar configurations are denoted with the same reference characters and the description thereof is omitted.

In the torque converter 401, pendulum-type dampers 80 are disposed on an outer circumferential side of a pump shell 21 and a turbine shell 31, and each pendulum-type damper 80 is attached to an inner circumferential surface of a case 10 by coupling an outer circumferential end part of the plate member 81 to an inner circumferential surface of a rear cover 13 by welding.

By coupling the pendulum-type damper 80 to the case 10 as described above, when a drive force is transmitted from the case 10 through a turbine hub 33 to a transmission mechanism, the pendulum-type damper 80 can reduce vibration caused by an engine. By utilizing the swing of a mass member 82, the pendulum-type damper 80 can reduce the vibration not only at an engine speed corresponding to a predetermined resonance frequency, but also at any other engine speed.

The pendulum-type damper 80 is attached to the case 10 to which the drive force from the engine is transmitted, and in both states where a lockup clutch 60 is not engaged and is engaged, the pendulum-type damper 80 reduces the vibration caused by the engine.

As described above, with the fluid transmission device 401 of this embodiment, the dynamic vibration absorbers 80 for reducing the vibration caused by the drive source are provided on the case 10, and each dynamic vibration absorber 80 is disposed on the outer circumferential side of the pump shell 21 and the turbine shell 31 to overlap with at least one of the pump shell 21 and the turbine shell 31 in an axial direction of the case 10. Thus, with the fluid transmission device 401 including the dynamic vibration absorber 80, compared to a configuration in which the dynamic vibration absorber does not overlap with the pump shell and the turbine shell in the axial direction, an axial dimension of the fluid transmission device 401 is shortened, and the fluid transmission device 401 can be configured compactly in the axial direction. Additionally, with the fluid transmission device 401 including the lockup clutch 60, the vibration reduction effect by the dynamic vibration absorber 80 can be effectively exerted.

Further, damper springs 70 are provided for reducing the vibration caused by the drive source when the lockup clutch 60 is engaged, and the damper springs 70 are disposed on an outer circumferential side of the lockup clutch 60 to overlap with the dynamic vibration absorbers 80, respectively, in radial directions of the case 10. Thus, the lockup clutch 60 and the damper springs 70 can be configured compactly in the axial direction and the damper springs 70 and the dynamic vibration absorbers 80 can be configured compactly in the radial direction. As a result, the fluid transmission device 401 can be configured compactly.

Further, each dynamic vibration absorber 80 is attached to the inner circumferential surface of the case 10. Thus, the dynamic vibration absorber 80 can be stably supported and the vibration reduction by the dynamic vibration absorber 80 can be effectively exerted.

Figure 7:
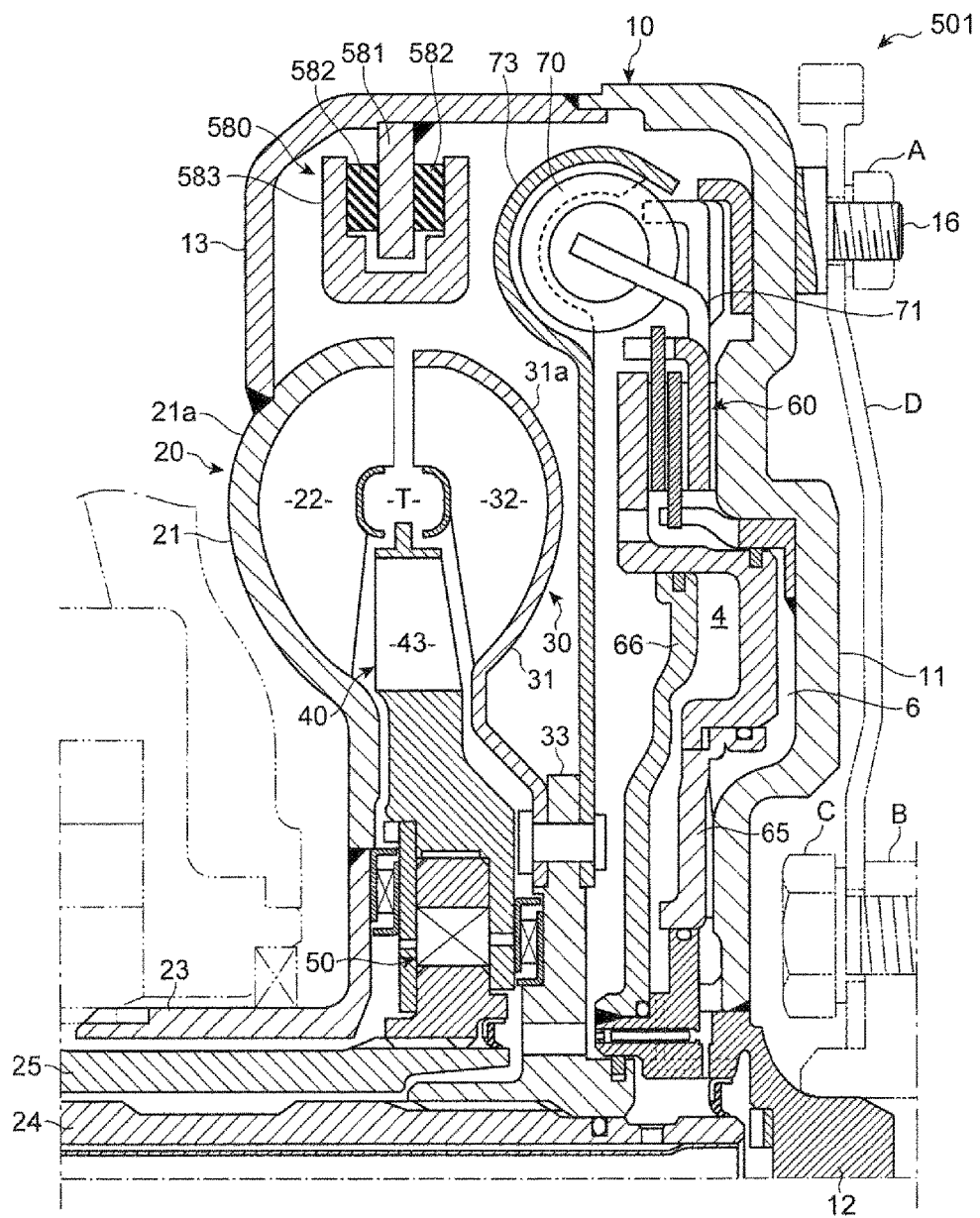
FIG. 7 is a cross-sectional view of a fluid transmission device according to a sixth embodiment of the present invention.

FIG. 7 is a cross-sectional view of a fluid transmission device according to a sixth embodiment of the present invention. Since the fluid transmission device 501 of the sixth embodiment is similar to the fluid transmission device 101 of the second embodiment except for the dynamic vibration absorber, the similar configurations are denoted with the same reference characters and the description thereof is omitted.

Also in the torque converter 501, a dynamic-type damper 580 is disposed on an outer circumferential side of a pump shell 21 and a turbine shell 31 and is attached to an inner circumferential surface of a case 10 by coupling an outer circumferential end part of a plate member 581 to an inner circumferential surface of a rear cover 13 by welding.

By coupling the dynamic-type damper 580 to the case 10 as described above, when a drive force is transmitted from the case 10 through a turbine hub 33 to a transmission mechanism, the dynamic-type damper 580 can reduce vibration caused by an engine. By utilizing a swing of a mass member 583, the dynamic-type damper 580 can reduce the vibration at an engine speed corresponding to a predetermined resonance frequency.

Also in this embodiment, the dynamic-type damper 580 is disposed on the outer circumferential side of the pump shell 21 and the turbine shell 31 to overlap with at least one of the pump shell 21 and the turbine shell 31 in an axial direction of the case 10. Damper springs 70 are disposed on a front side of the dynamic-type damper 580 to overlap therewith in radial directions of the case 10.

As described above, also with the fluid transmission device 501 of this embodiment, the dynamic vibration absorber 580 for reducing the vibration caused by the drive source is provided on the case 10, and the dynamic vibration absorber 580 is disposed on the outer circumferential side of the pump shell 21 and the turbine shell 31 to overlap with at least one of the pump shell 21 and the turbine shell 31 in the axial direction. Thus, compared to a configuration in which the dynamic vibration absorber does not overlap with the pump shell and the turbine shell in the axial direction, an axial dimension of the fluid transmission device 501 is shortened, and the fluid transmission device 501 can be configured compactly in the axial direction. Additionally, with the fluid transmission device 501 including a lockup clutch 60, the vibration reduction effect by the dynamic vibration absorber 580 can be effectively exerted.

Figure 8:
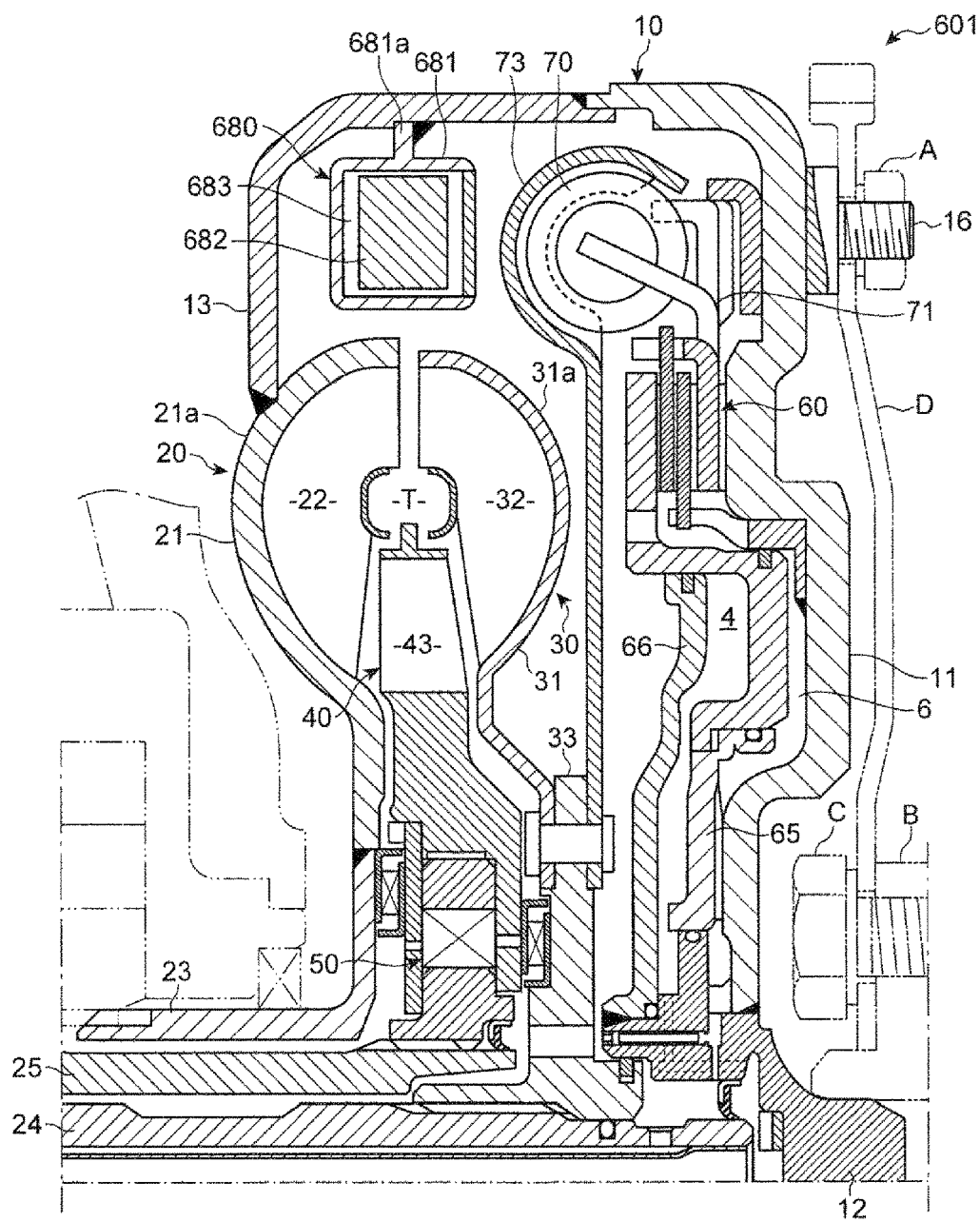
FIG. 8 is a cross-sectional view of a fluid transmission device according to a seventh embodiment of the present invention.

FIG. 8 is a cross-sectional view of a fluid transmission device according to a seventh embodiment of the present invention. Since the fluid transmission device 601 of the seventh embodiment is similar to the fluid transmission device 201 of the third embodiment except for the dynamic vibration absorber, the similar configurations are denoted with the same reference characters and the description thereof is omitted.

Also in the torque converter 601, a viscous-type damper 680 is disposed on an outer circumferential side of a pump shell 21 and a turbine shell 31 and is attached to an inner circumferential surface of a case 10 by coupling, to an inner circumferential surface of a rear cover 13 by welding, an annular-shaped extension part 681*a* provided on an outer circumferential end part of a casing 681 and extending in radial directions of the case 10.

By coupling the viscous-type damper 680 to the case 10 as described above, when a drive force is transmitted from the case 10 through a turbine hub 33 to a transmission mechanism, the viscous-type damper 680 can reduce vibration caused by an engine. By utilizing a swing of a mass member 682, the viscous-type damper 680 can reduce the vibration at an engine speed corresponding to a predetermined resonance frequency.

Also in this embodiment, the viscous-type damper 680 is disposed on the outer circumferential side of the pump shell 21 and the turbine shell 31 to overlap with at least one of the pump shell 21 and the turbine shell 31 in an axial direction of the case 10. Damper springs 70 are disposed on a front side of the viscous-type damper 680 to overlap therewith in radial directions of the case 10.

As described above, also with the fluid transmission device 601 of this embodiment, the dynamic vibration absorber 680 for reducing the vibration caused by the drive source is provided on the case 10, and the dynamic vibration absorber 680 is disposed on the outer circumferential side of the pump shell 21 and the turbine shell 31 to overlap with at least one of the pump shell 21 and the turbine shell 31 in the axial direction. Thus, compared to a configuration in which the dynamic vibration absorber does not overlap with the pump shell and the turbine shell in the axial direction, an axial dimension of the fluid transmission device 601 is shortened, and the fluid transmission device 601 can be configured compactly in the axial direction. Additionally, with the fluid transmission device 601 including a lockup clutch 60, the vibration reduction effect by the dynamic vibration absorber 680 can be effectively exerted.

Figure 9:
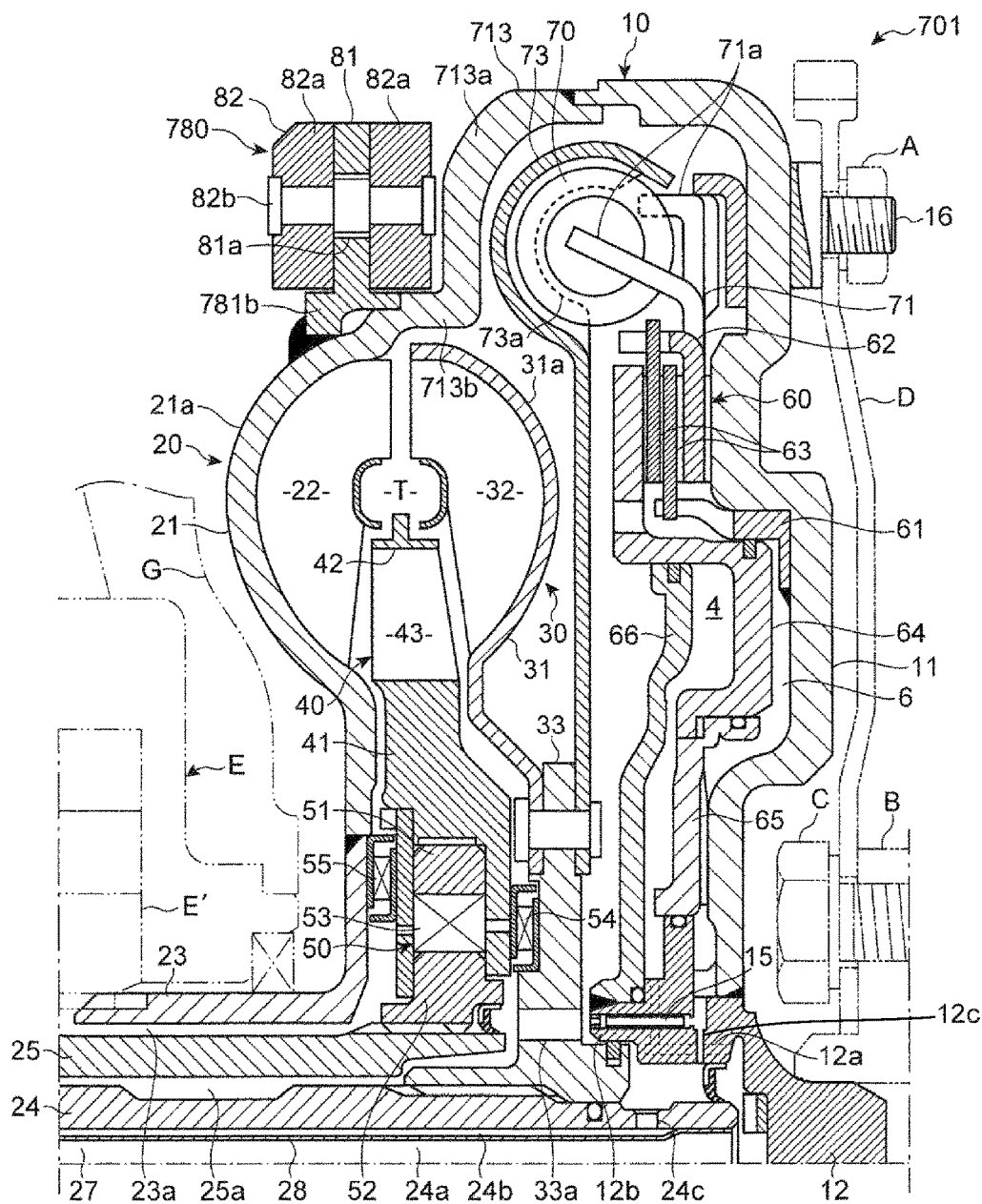
FIG. 9 is a cross-sectional view of a fluid transmission device according to an eighth embodiment of the present invention.

FIG. 9 is a cross-sectional view of a fluid transmission device according to an eighth embodiment of the present invention. Since the fluid transmission device 701 of the eighth embodiment is similar to the fluid transmission device 401 of the fifth embodiment except that a rear cover of a case is integrally formed with a pump shell by extending through a space between a side of damper springs and a side of dynamic vibration absorbers, and the dynamic vibration absorbers are attached to an outer circumferential surface of the case, similar configurations are denoted with similar reference characters and the description thereof is omitted.

A pendulum-type damper 780, similarly to the pendulum-type damper 80, has an annular-shaped plate member 81 as a supporting body and, as a swing body capable of swinging with respect to the supporting body, a mass member 82 is swingably supported by the plate member 81. Specifically, the mass member 82 is swingably supported by an arc-shaped guide hole 81*a* that is formed in the plate member 81 to extend in a circumferential direction of a case 10.

The mass member 82 has two plates 82*a* formed into a circular disk shape and a coupling part 82*b*, having a substantially cylindrical shape, for coupling the two plates 82*a* to each other. By inserting the coupling part 82*b* into the guide hole 81*a* of the plate member 81 in a state where the plate member 81 is disposed between the two plates 82*a*, the mass member 82 is swingably supported by the plate member 81.

In the torque converter 701, a rear cover 713 of the case 10 includes a vertical wall part 713*a* coupled to a front cover 11 and extending in radial directions of the case 10 through a space between a side of damper springs 70 and a side of the pendulum-type damper 780, and a cylindrical part 713*b* extending in an axial direction of the case 10 from an inner circumferential end part of the vertical wall part 713*a* at a position on an outer circumferential side of a turbine shell 31, and coupled to an outer-most circumferential part of a pump shell 21. In this embodiment, the rear cover 713 is integrally formed with the pump shell 21.

Further, the pendulum-type damper 780 is disposed on the outer circumferential side of the pump shell 21 and the turbine shell 31, and the pendulum-type damper 780 is attached to an outer circumferential surface of the case 10 by coupling an annular-shaped flange part 781*b*, provided on an inner circumferential end part of the plate member 81, to outer circumferential surfaces of the rear cover 713 and the pump shell 21 by welding.

Also in this embodiment, the pendulum-type damper 780 is attached to the case 10 to which a drive force from an engine is transmitted, and in both states where a lockup clutch 60 is not engaged and is engaged, the pendulum-type damper 780 reduces the vibration caused by the engine.

In this embodiment, the pendulum-type damper 780 disposed on the outer circumferential side of the pump shell 21 and the turbine shell 31 overlaps with both of the pump shell 21 and the turbine shell 31 in the axial direction; however, the pendulum-type damper 780 may alternatively only overlap with one of the pump shell 21 and the turbine shell 31 in the axial direction.

As described above, also with the fluid transmission device 701 of this embodiment, the dynamic vibration absorber 780 for reducing the vibration caused by the drive source is provided on the case 10, and the dynamic vibration absorber 780 is disposed on the outer circumferential side of the pump shell 21 and the turbine shell 31 to overlap with at least one of the pump shell 21 and the turbine shell 31 in the axial direction. Thus, with the fluid transmission device 701 including the dynamic vibration absorber 780, compared to a configuration in which the dynamic vibration absorber does not overlap with the pump shell and the turbine shell in the axial direction, an axial dimension of the fluid transmission device 701 is shortened, and the fluid transmission device 701 can be configured compactly in the axial direction. Additionally, with the fluid transmission device 701 including the lockup clutch 60, the vibration reduction effect by the dynamic vibration absorber 780 can be effectively exerted.

Further, the dynamic vibration absorber 780 is attached to the outer circumferential surface of the case 10. Thus, the dynamic vibration absorber 780 can be stably supported and the vibration reduction effect by the dynamic vibration absorber 780 can be effectively exerted. Moreover, by attaching the dynamic vibration absorber 780 to the outer circumferential surface of the case 10, compared to a configuration in which the dynamic vibration absorber 780 is attached to an inner circumferential surface of the case 10, the size of the space to be filled with fluid can be reduced so as to lower the fluid supply amount, and a weight reduction can be achieved.

In the fifth to eighth embodiments, the pendulum-type dampers 80 and 780, the dynamic-type damper 580, and the viscous-type damper 680 are respectively used as the dynamic vibration absorber provided on the case 10; however, other dynamic vibration absorbers may be used.

FIGS. 10 to 13 are views of a fluid transmission device according to a ninth embodiment in which the present invention is applied to a torque converter of an automatic transmission. The fluid transmission device of the ninth embodiment is described in detail with reference to FIGS. 10 to 13.

Figure 10:
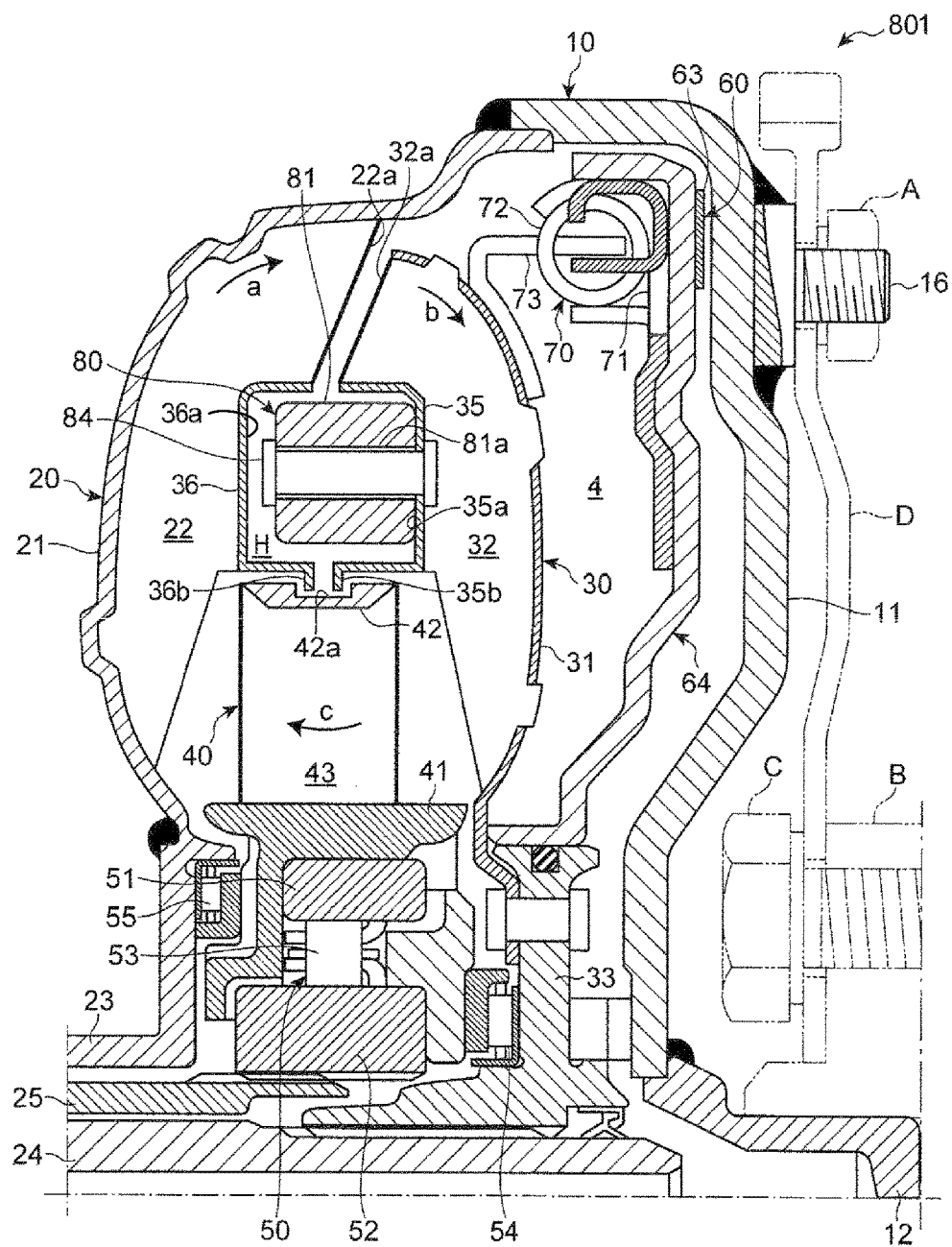
FIG. 10 is a cross-sectional view of a fluid transmission device according to a ninth embodiment of the present invention.

As illustrated in FIG. 10, the torque converter 801 as the fluid transmission device of this embodiment is incorporated in the automatic transmission and has a case 10 forming an outer shell of the torque converter 801.

The case 10 is attached to an outer circumferential part of a drive plate D by a plurality of stud bolts 16 that are fixedly provided on an outer circumferential part of a front cover 11 forming an engine-side (i.e., drive source side) surface of the case 10, and nuts A for being engaged with the stud bolts 16, respectively. The drive plate D is attached to an end part of a crankshaft B of the engine by using a crank bolt C. Thus, the torque converter 801 is entirely coupled to the crankshaft B so as to be driven by the engine. It will be noted that henceforth, in the following description, the engine side (right side of the drawings) shall be referred to as the front side and an opposite side from the engine (left side of the drawings) shall be referred to as the rear side.

The torque converter 801 includes a pump 20 for integrally rotating with the case 10, a turbine 30 facing the front side of the pump 20, and a stator 40 disposed between the opposing parts of the pump 20 and the turbine 30.

Oil is filled inside the case 10 as drive force transmission fluid and can circulate through an annular path formed by the pump 20, the turbine 30, and the stator 40. Thus, the torque converter 801 can transmit to the turbine 30 a rotational force inputted to the pump 20, by using the oil circulating within the annular path as a transmission medium. Hereinafter, the respective components of the torque converter 801 are described in detail.

The pump 20 includes a pump shell 21 forming an outer shell thereof, a pump core ring 36 forming an inner shell thereof, and a plurality of pump blades 22 supported between the pump shell 21 and the pump core ring 36.

The pump shell 21 is coupled to the rear side of the case 10 and capable of integrally rotating with the case 10.

Further, the pump shell 21 is a ring-shaped member having a bowl-shaped cross section that bulges rearward, and has an inner circumferential surface formed into a concave curved surface by stamping. On this inner circumferential surface of the pump shell 21, the plurality of pump blades 22 are disposed at an even interval in a circumferential direction of the pump 20 to extend radially and a rear side of circumferential edge portions of the pump blades 22 are fixed to the inner circumferential surface by spot welding, for example. It will be noted that, in this embodiment, a front end part 22*a* that is an outer circumferential side part of each pump blade 22 is formed substantially straight while inclining forward as it extends circumferentially outward.

Moreover, a pump sleeve 23 is coupled by, for example, welding to an inner circumferential end part of the pump shell 21 to extend to a transmission mechanism side. A tip part of the pump sleeve 23 is engaged with a gear oil pump (not illustrated) disposed on the rear side of the torque converter 801. Thus, this oil pump is driven by the rotation of the crankshaft B via the case 10, the pump shell 21, and the pump sleeve 23.

The pump core ring 36 is a ring-shaped member having a bowl-shaped cross section that bulges rearward, and has an inside surface formed into a forward-opening concavity by stamping. A bottom face 36*a* forming a rear part of the inside surface is formed into an annular-shaped plane extending perpendicularly to a rotational axis of the case 10. Further, the pump core ring 36 has an inner circumferential part 36*b* extending circumferentially inward therefrom.

Moreover, base (front) end parts of the pump blades 22 are fixed to an outer circumferential surface of the pump core ring 36.

Further, by integrally rotating with the case 10, the oil filling the case 10 is guided by the pump blades 22 and the inner circumferential surface of the pump shell 21 to cause a flow "a" of the oil oriented forward while revolving about the rotational axis.

The turbine 30 includes a turbine shell 31 forming an outer shell thereof, a turbine core ring 35 forming an inner shell thereof, and a plurality of turbine blades 32 supported between the turbine shell 31 and the turbine core ring 35.

The turbine shell 31 faces the pump shell 21, is a ring-shaped member having a bowl-shaped cross section that bulges forward, and has an inner circumferential surface formed into a concave curved surface by stamping. On this inner circumferential surface of the turbine shell 31, the plurality of turbine blades 32 are disposed at even intervals in a circumferential direction of the turbine 30 to extend radially, and a front side of the circumferential edge portions of the turbine blades 32 is fixed to the inner circumferential surface by spot welding, for example. It will be noted that, in this embodiment, a rear end part 32a that is an outer circumferential part of each turbine blade 32 is formed substantially straight while inclining forward as it extends circumferentially outward in parallel with the front end part 22a of the pump blade 22 facing thereto.

Further, a turbine hub 33, extending in the axial direction at a position on the inner circumferential side of the turbine shell 31, is coupled to the turbine shell 31 by rivets, for example. The turbine hub 33 is formed with splines in its inner circumferential surface, and is spline-fitted to a turbine shaft 24 extending, on the inner circumferential side of the turbine hub 33, to the transmission mechanism side of the automatic transmission.

The turbine core ring 35 is a ring-shaped member having a bowl-shaped cross section that bulges forward, and has an inside surface formed into a rearward-opening concavity by stamping. A bottom face 35a forming a front part of the inside surface is formed into an annular-shaped plane extending perpendicularly to the rotational axis.

Since the turbine and pump core rings 35 and 36 face each other and have their inside surfaces concaved and opening towards each other as described above, in this embodiment, an annular-shaped core space H having a substantially-rectangular cross section is formed between the inside surfaces.

Further, the turbine core ring 35 has an inner circumferential part 35b extending circumferentially inward therefrom, and the inner circumferential part 36b of the pump core ring 36 and the inner circumferential part 35b of the turbine core ring 35 extend circumferentially inward while directly facing each other.

Moreover, base (rear) end parts of the turbine blades 32 are fixed to an outer circumferential surface of the turbine core ring 35.

Since the inner circumferential surfaces of the turbine shell 31 and pump shell 21 face each other as described above, the flow "a" caused by the rotation of the pump 20 is introduced into the turbine shell 31, a flow "b" oriented circumferentially inward is formed by the inner circumferential surface of the turbine shell 31 and the turbine blades 32, and the flow "b" pushes the turbine blades 32. Thus, the turbine 30 receives a force in its circumferential direction and is driven in the same direction as the pump 20. This drive force is transmitted to the transmission mechanism by the turbine shaft 24 coupled to the turbine 30.

The stator 40 is disposed between the opposing parts of the pump 20 and the turbine 30 and integrated as a whole by having multiple blades 43 extending radially between an inner ring part 41 and an outer ring part 42 and disposed at predetermined intervals in a circumferential direction of the stator 40. The blades 43 are disposed between an inner circumferential end part of the pump blades 22 of the pump 20 and an inner circumferential end part of the turbine blades 32 of the turbine 30. Thus, the flow "b" of the fluid after driving the turbine 30 is introduced from the turbine 30 side, and a flow "c" passing through between the blades 43 is formed. This flow "c" is introduced into a curved part of the pump shell 21 from the inner circumferential side to become the flow "a", and thus, a flow circulating through between the blades 22, 32 and 43 of the pump 20, the turbine 30 and the stator 40, respectively, is formed.

Here, the outer ring part 42 of the stator 40 has a circumferential groove 42a in an outer circumferential surface thereof. The inner circumferential parts 36b and 35b of the pump and turbine core rings 36 and 35, respectively, are disposed in a manner such that circumferential edges thereof are inserted into the circumferential groove 42a with a gap.

Further, the torque converter 801 includes a one-way clutch 50 supporting the stator 40 for achieving a torque increase effect of the stator 40. The one-way clutch 50 is disposed on the inner circumferential side of the stator 40 and has an outer race 51, an inner race 52, and a plurality of sprags 53 interposing between both races 51 and 52. An inner circumferential surface of the inner ring part 41 of the stator 40 is spline-fitted by press-fitting onto an outer circumferential surface of the outer race 51, and an inner circumferential surface of the inner race 52 is spline-fitted onto a stator shaft 25 extending from a transmission case (not illustrated) of the automatic transmission, so that the inner race 52 is coupled to the stator shaft 25.

It will be noted that the axial position of the one-way clutch 50 is regulated by a thrust bearing 54 which is disposed between the one-way clutch 50 and the turbine hub 33 that is positioned on the front side of the one-way clutch 50, and by the thrust bearing 55 which is disposed between the one-way clutch 50 and the pump sleeve 23 that is coupled to the pump shell 21 and positioned on the rear side of the one-way clutch 50. Thus, the stator 40 is positioned relative to the pump 20 and the turbine 30 in the axial direction.

When a pushing force acts on the blades 43 from one side by the flow "c" and the stator 40 receives a rotational force in the corresponding direction, the one-way clutch 50 rotates idly and, thus, the stator 40 rotates freely. On the other hand, when a pushing force acts on the blades 43 from the other side and the stator 40 receives a rotational force in the other direction, the one-way clutch 50 locks itself and, thus, the stator 40 is fixed. Here, the torque increase effect is exerted, so that the torque inputted from the engine to the pump 20 is increased and the torque is outputted from the turbine 30 to the turbine shaft 24.

Further, the torque converter 801 includes a lockup clutch 60 disposed between the turbine 30 and the case 10. The lockup clutch 60 directly couples the pump shell 21 and the turbine shell 31 to each other and includes a piston 64 facing the front cover 11 inside the case 10, and also includes a plurality of friction plates 63 fixedly attached to a front surface of the piston 64.

The piston 64 is slidable relative to the turbine hub 33 in the axial direction. An oil pressure chamber 4, into which engaging oil pressure of the lockup clutch 60 is applied, is formed between the piston 64 and the turbine shell 31. When a predetermined engaging oil pressure is applied to the oil pressure chamber 4, the piston 64 slides forward, the plurality of friction plates 63 provided on the piston 64 are pushed against the front cover 11, and the lockup clutch 60 is engaged.

A damper spring mechanism 70 elastically deforms in the rotating direction when the lockup clutch 60 is engaged so as to reduce vibration caused by the engine, and is provided adjacent to the lockup clutch 60.

The damper spring mechanism 70 has a spring receiving member 71 integrally formed with the piston 64 and extending rearward, and a plurality of damper springs 72 disposed at even intervals in the circumferential direction of the case 10 by using the spring receiving member 71. It will be noted that the damper springs 72 preferably have a large torsion angle and low rigidity.

Further, an end part of a spring holding plate 73, which is coupled to an outer circumferential surface of the turbine shell 31 and extended forward, is engaged with one end of each spring 72, and when the lockup clutch 60 is engaged, the rotation on the pump shell 21 side (in other words, the rotation of the crankshaft B) is inputted to the spring receiving member 71 via the lockup clutch 60, further passes through the damper springs 72, and then is transmitted from the spring holding plate 73 to the turbine shell side, specifically the turbine hub 33.

In this embodiment, the torque converter 801 includes, inside the case 10, a centrifugal pendulum-type damper 80 as a dynamic vibration absorber having a swing body for reducing the vibration caused by the engine.

The centrifugal pendulum-type damper 80 is provided at a plurality of positions in the circumferential direction of the case 10 within the core space H surrounded by the pump core ring 36 and the turbine core ring 35. Each pendulum-type damper 80 has a mass member 81 as the swing body, and a plurality of supporting pins 84 for swingably supporting the mass member 81 to the turbine core ring 35 that is a supporting body.

Figure 11:
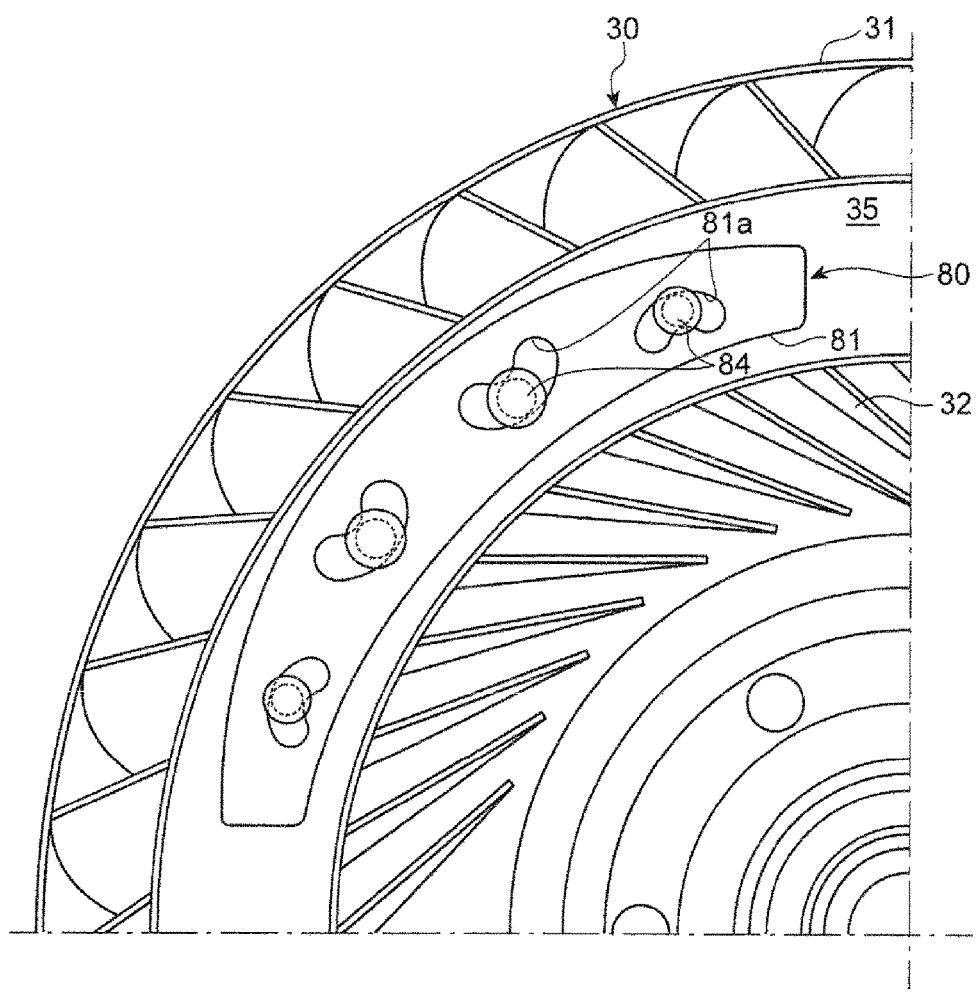
FIG. 11 is a view of a dynamic vibration absorber illustrated in FIG. 10 and its peripheral part seen in an axial direction.

As illustrated in FIG. 11, the mass member 81 is an arc-shaped member having a substantially-rectangular cross section and extending in the circumferential direction. The mass member 81 has arc-shaped guide holes 81a penetrating therethrough in the front-and-rear directions, and is swingably supported by the annular-shaped plane surface 35a of the inside surface of the turbine core ring 35 by inserting the supporting pins 84 into the guide holes 81a, respectively. It will be noted that each supporting pin 84 has, at both ends, head parts having a large diameter so as not to slip out from the guide hole 81a of the mass member 81 unintentionally.

By coupling the pendulum-type damper 80 to the turbine core ring 35 as described above, when the drive force is transmitted from the case 10 via the turbine hub 33 coupled to the turbine core ring 35, the pendulum-type damper 80 can reduce a torque variation of the engine.

Figure 12:
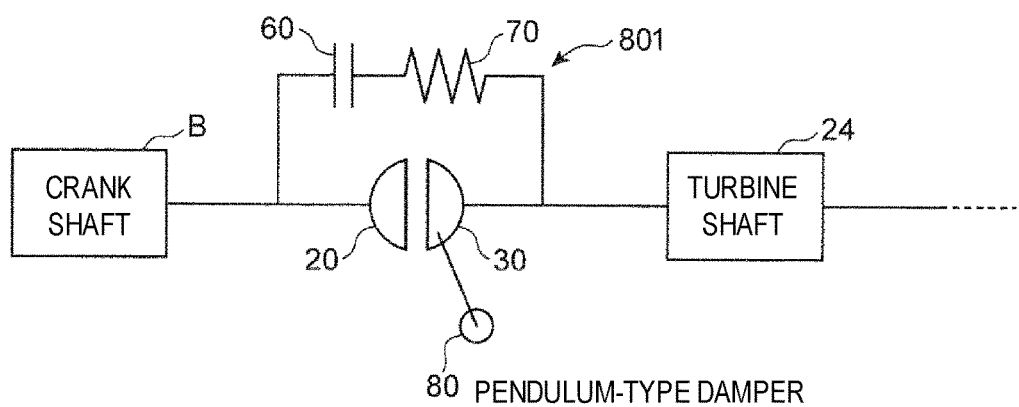
FIG. 12 is a system diagram illustrating a drive force transmission system of the fluid transmission device of FIG. 10.

Hereinafter, the operation of the torque converter 801 having the above configuration is described with reference to FIG. 12.

When the lockup clutch 60 is not engaged, the engine output is transmitted from the pump 20 coupled to the case 10 integrally rotating with the crankshaft B of the engine, to the turbine 30 via the oil, and transmitted to the transmission mechanism through the turbine hub 33 and the turbine shaft 24. Here, at a transmission ratio at which the torque increase effect of the stator 40 can be exerted, the output torque of the engine is increased and outputted to the transmission mechanism.

On the other hand, when the lockup clutch 60 is engaged, since the pump 20 is coupled to the turbine 30 via the lockup clutch 60, the engine output is transmitted from the front cover 11 of the case 10 integrally rotating with the crankshaft B of the engine, to the lockup clutch 60, the damper spring mechanism 70, and the turbine hub 33 coupled to the turbine 30, and then further transmitted to the transmission mechanism through the turbine shaft 24. Here, since the engine output can be transmitted to the transmission mechanism without using the oil, compared to when the lockup clutch 60 is not engaged, torque transmission efficiency is improved and a fuel economy of the engine is also improved.

Figure 13:
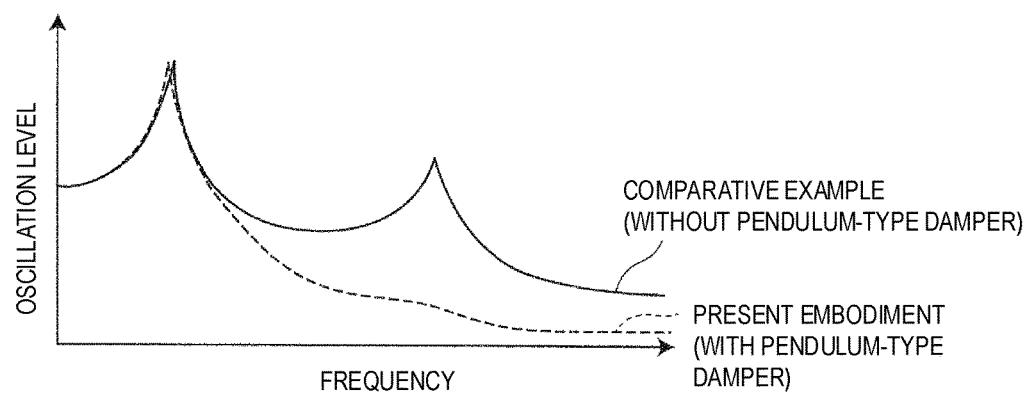
FIG. 13 is a chart illustrating an effect of vibration reduction by the dynamic vibration absorber (pendulum-type damper) of FIG. 10.

The pendulum-type damper 80 is attached to the turbine core ring 35 coupled to the turbine hub 33 to which the drive force from the engine is transmitted, and therefore, in both states where the lockup clutch 60 is not engaged and is engaged, the pendulum-type damper 80 reduces the vibration caused by the engine. In this embodiment, since the centrifugal pendulum-type damper 80 is used as the dynamic vibration absorber, as illustrated in FIG. 13, by utilizing the swing of the mass member 81, the pendulum-type damper 80 can reduce the vibration not only at an engine speed corresponding to a target resonance frequency, but also over a wide range around the engine speed corresponding to the target resonance frequency. In the example of FIG. 13, in a configuration in which the torque converter is applied to a four-cylinder engine, a comparative example in which only the lockup damper (i.e., damper spring mechanism 70) is provided and a present embodiment, in which the pendulum-type damper is provided in addition to the lockup damper, are compared to each other. In the present embodiment, the target is the secondary resonance peak, where an issue of muffled noise easily occurs in the comparative example. The present embodiment, in which the pendulum-type damper is added, indicates that the secondary resonance peak can be eliminated almost completely and a skirt part of a continuous resonance peak thereto can widely be attenuated.

Next, a fluid transmission device according to a tenth embodiment is described in detail with reference to FIGS. 14 to 16. It will be noted that, since the fluid transmission device 901 of the tenth embodiment is similar to the fluid transmission device 801 of the ninth embodiment except for the dynamic vibration absorber, the similar configurations are denoted with the same reference characters and the description thereof is omitted.

Figure 14:
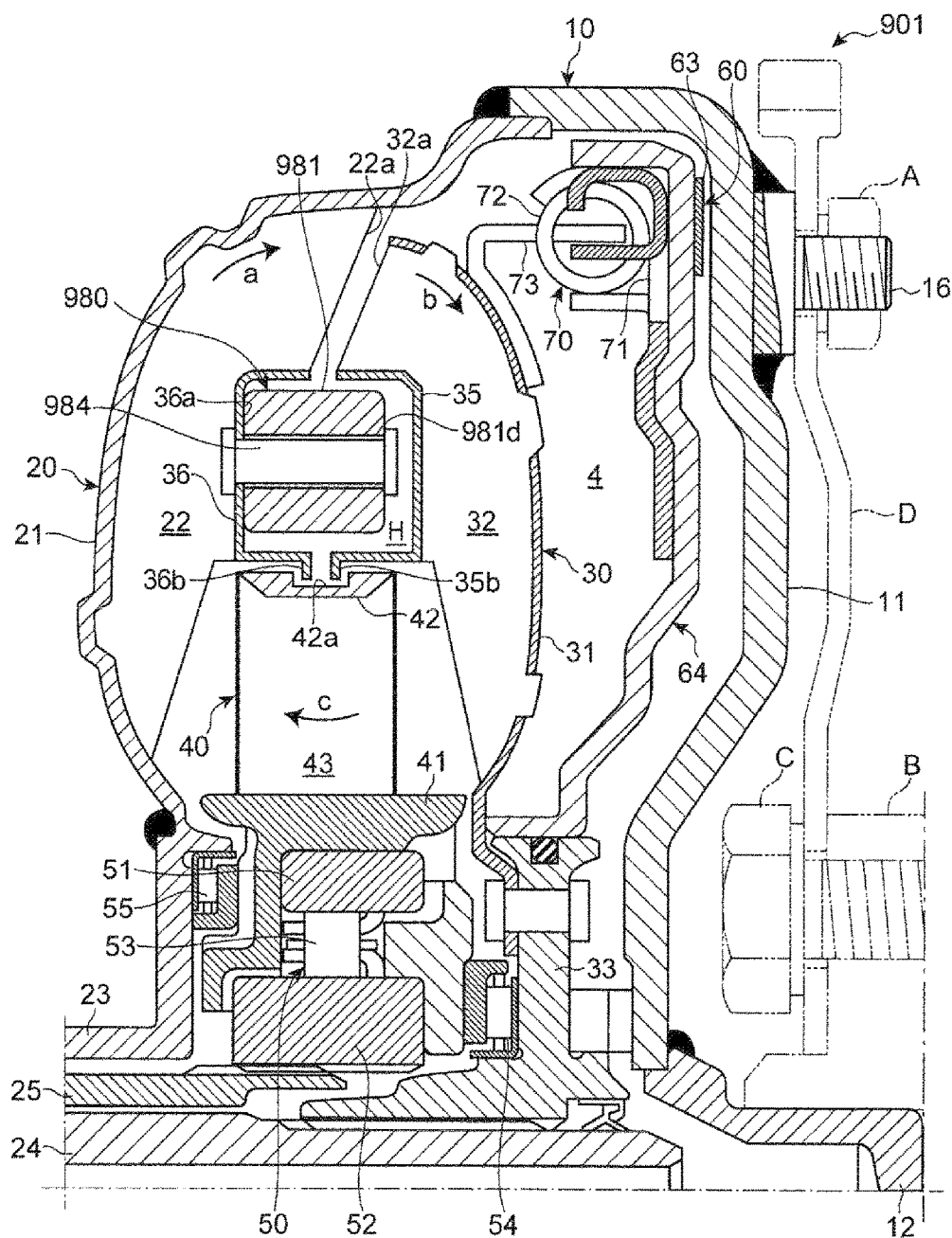
FIG. 14 is a cross-sectional view of a fluid transmission device according to a tenth embodiment of the present invention.

As illustrated in FIG. 14, the torque converter 901 as the fluid transmission device of the tenth embodiment also includes, a pump 20, a turbine 30, a stator 40, a one-way clutch 50, a lockup clutch 60, and a damper spring mechanism 70. These components are accommodated inside a case 10 and oil is filled inside the case 10.

Similarly to the ninth embodiment, the torque converter 901 includes, inside the case 10, a centrifugal pendulum-type damper 980 as a dynamic vibration absorber having a swing body for reducing vibration caused by a drive source. The pendulum-type damper 980 of this embodiment is different from the pendulum-type damper 80 of the ninth embodiment only in that it is attached to a pump core ring 36 and not a turbine core ring 35.

The centrifugal pendulum-type damper 980 is provided at a plurality of positions in a circumferential direction of the case 10 within a core space H surrounded by the pump core ring 36 and the turbine core ring 35. In this embodiment, each pendulum-type damper 980 has a mass member 981 as the swing body, and a plurality of supporting pins 984 for swingably supporting the mass member 981 to the pump core ring 36 that is a supporting body.

Figure 15:
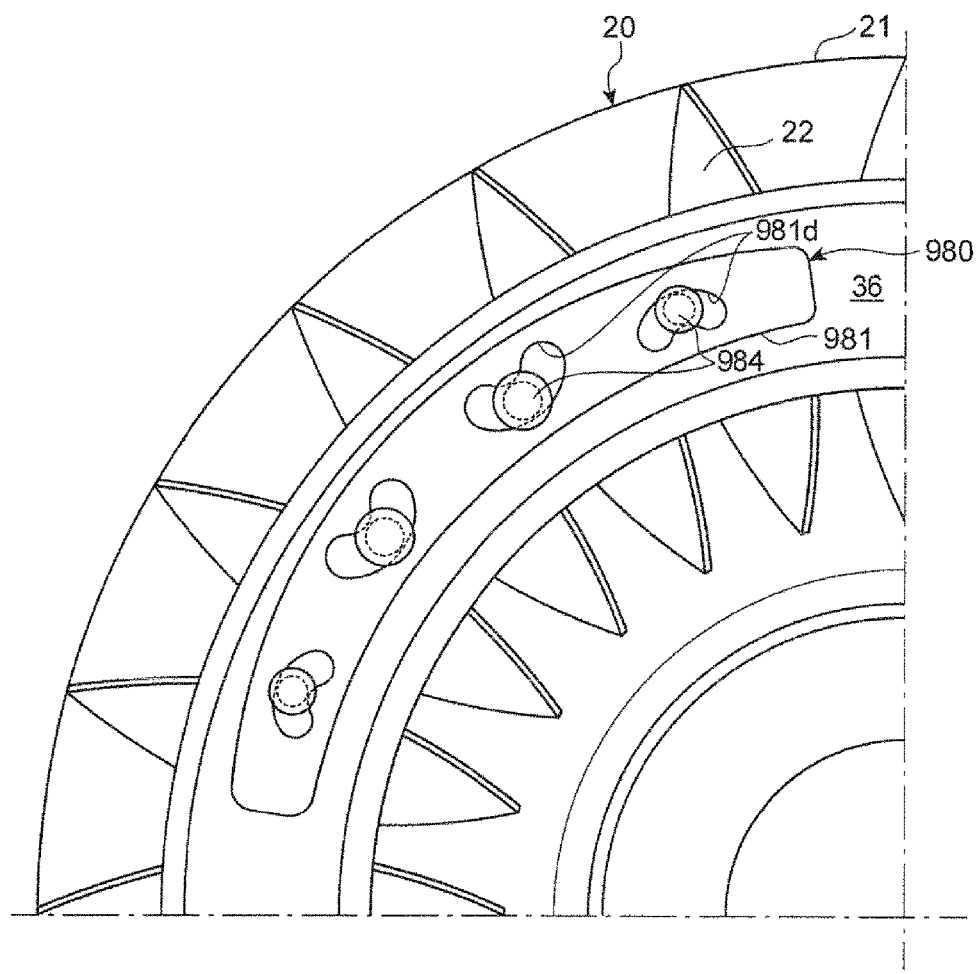
FIG. 15 is a view of a dynamic vibration absorber illustrated in FIG. 14 and its peripheral part seen in an axial direction.

As illustrated in FIG. 15, the mass member 981 is an arc-shaped member having a substantially-rectangular cross section and extending in a circumferential direction of the case 10. The mass member 981 has arc-shaped guide holes 981d penetrating therethrough in the front-and-rear directions, and is swingably supported by an annular-shaped plane surface 36a of an inside surface of the pump core ring 36 by inserting the supporting pins 984 into the guide holes 981d, respectively.

Figure 16:
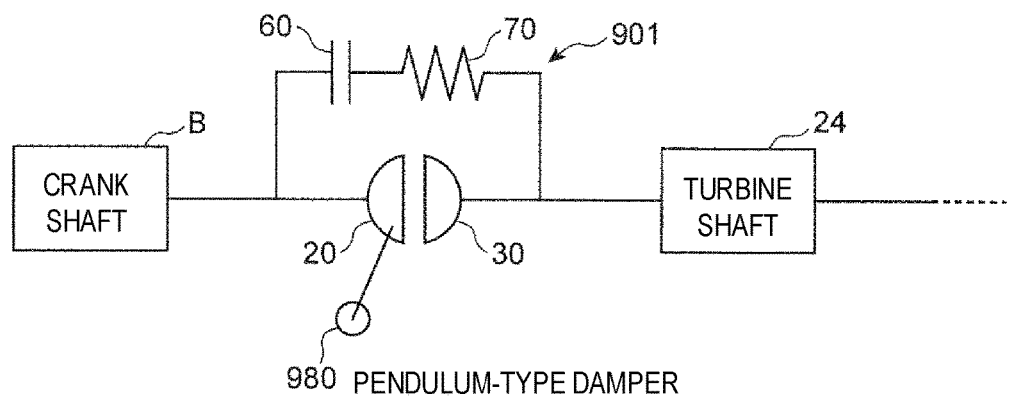
FIG. 16 is a system diagram illustrating a drive force transmission system of the fluid transmission device of FIG. 14.

As illustrated in FIG. 16, the pendulum-type damper 980 is attached to the pump core ring 36 of the pump 20 to which a drive force is transmitted from the engine, and therefore, in both states where a lockup clutch 60 is not engaged and is engaged, the pendulum-type damper 980 reduces the vibration caused by the engine. Further, also in this embodiment, since the centrifugal pendulum-type damper 980 is used as the dynamic vibration absorber, as illustrated in FIG. 13, by utilizing a swing of the mass member 981, the pendulum-type damper 980 can reduce the vibration not only at an engine speed corresponding to a target resonance frequency, but also over a wide range around the engine speed corresponding to the target resonance frequency.

Next, a fluid transmission device according to an eleventh embodiment is described in detail with reference to FIG. 17. It will be noted that, since the fluid transmission device 1001 of the eleventh embodiment is similar to the fluid transmission device 801 of the ninth embodiment except for the dynamic vibration absorber, the similar configurations are denoted with the same reference characters and the description thereof is omitted.

Figure 17:
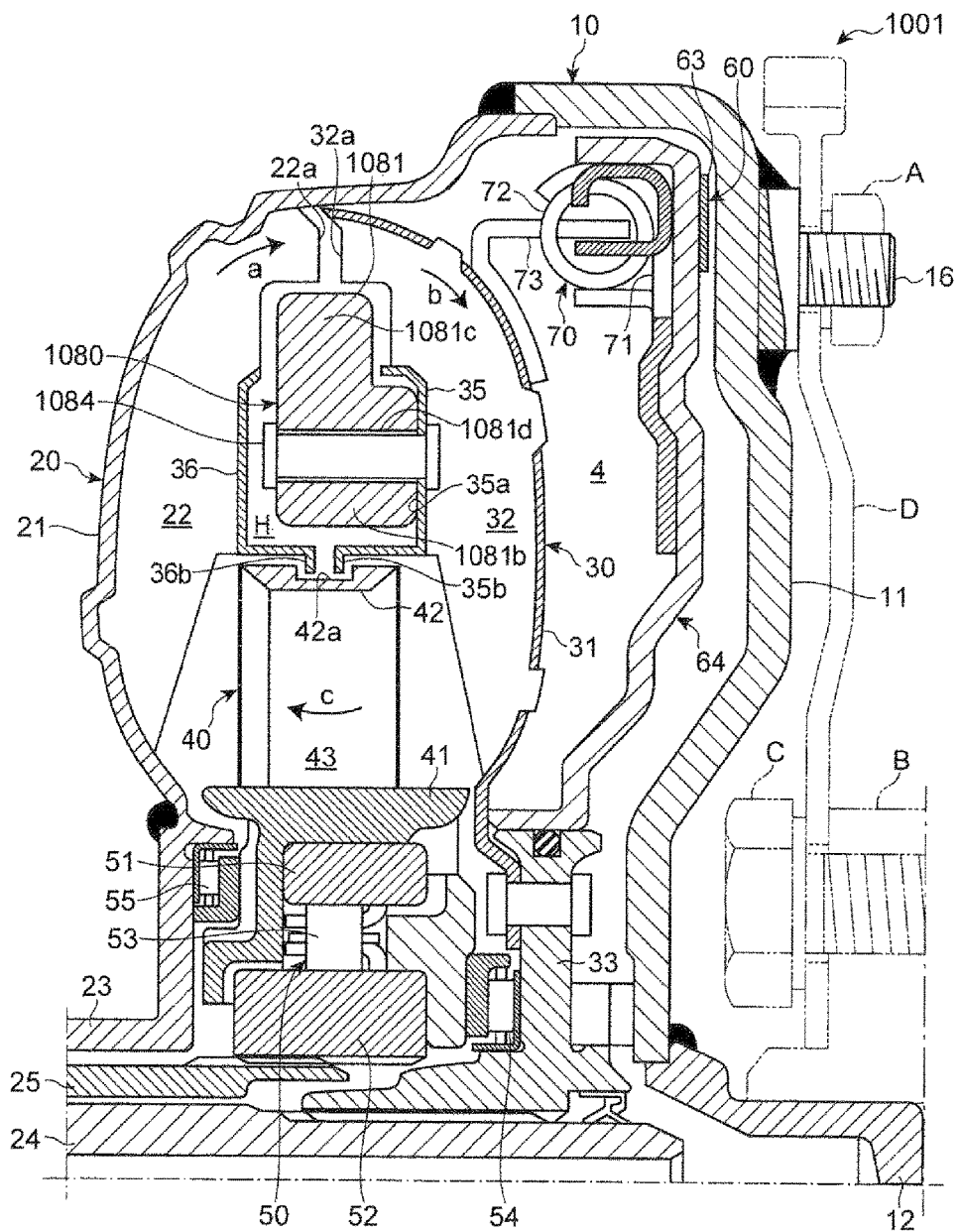
FIG. 17 is a cross-sectional view of a fluid transmission device according to an eleventh embodiment of the present invention.

As illustrated in FIG. 17, similarly to the ninth embodiment, the torque converter 1001 includes, inside a case 10, centrifugal pendulum-type dampers 1080 as a dynamic vibration absorber having a swing body for reducing vibration caused by a drive source. Further, the pendulum-type dampers 1080 are different from the pendulum-type dampers 80 of the ninth embodiment in that they are still attached to a turbine core ring 35 similarly to the ninth embodiment, but arranged to partially reach outside a core space H surrounded by a pump core ring 36 and the turbine core ring 35.

Each pendulum-type damper 1080 has a mass member 1081 as the swing body, and a plurality of supporting pins 1084 for swingably supporting the mass member 1081 to the turbine core ring 35 that is a supporting body.

In this embodiment, the mass member 1081 is an arc-shaped member extending in a circumferential direction of the case 10, and has a main body 1081b disposed within the core space H and having a substantially-rectangular cross section, and a convex part 1081c integrally provided on the main body 1081b and projecting circumferentially outward to reach outside the core space H. The main body 1081b is formed with arc-shaped guide holes 1081d penetrating therethrough in the front-and-rear directions, and is swingably supported by an annular-shaped plane surface 35a of an inside surface of the turbine core ring 35 by inserting the supporting pins 1084 into the guide holes 1081d, respectively.

Thus, similarly to the ninth and tenth embodiments, in both states where a lockup clutch 60 is not engaged and is engaged, the pendulum-type damper 1080 reduces the vibration caused by the engine, and by utilizing a swing of the mass member 1081, the pendulum-type damper 1080 can reduce the vibration not only at an engine speed corresponding to a target resonance frequency, but also over a wide range around the engine speed corresponding to the target resonance frequency.

It will be noted that, although the pendulum-type damper 1080 is attached to the turbine core ring 35 in this embodiment, it may be attached to the pump core ring 36 similarly to the tenth embodiment.

Figure 20:
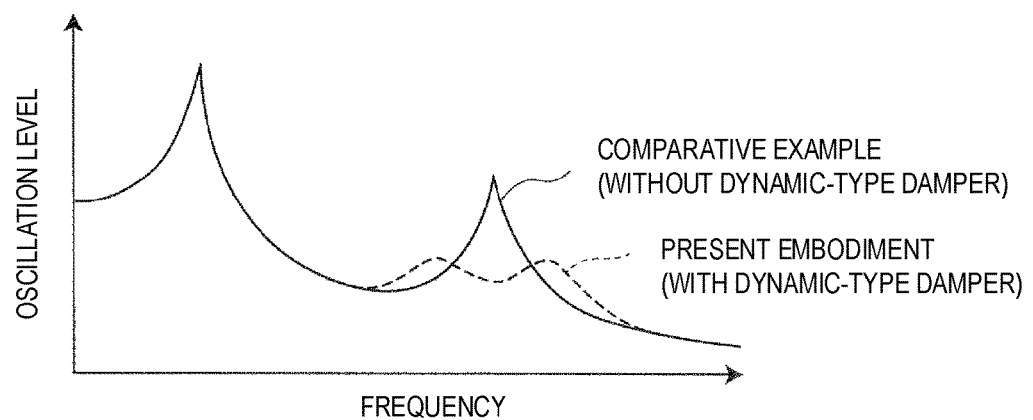
FIG. 20 is a chart illustrating an effect of vibration reduction by the dynamic vibration absorbers (dynamic-type dampers) of FIGS. 18 and 19.

Next, a fluid transmission device according to a twelfth embodiment is described in detail with reference to FIGS. 18 and 20. It will be noted that, since the fluid transmission device 1101 of the twelfth embodiment is similar to the fluid transmission device 801 of the ninth embodiment except for the dynamic vibration absorber, the similar configurations are denoted with the same reference characters and the description thereof is omitted.

Figure 18:
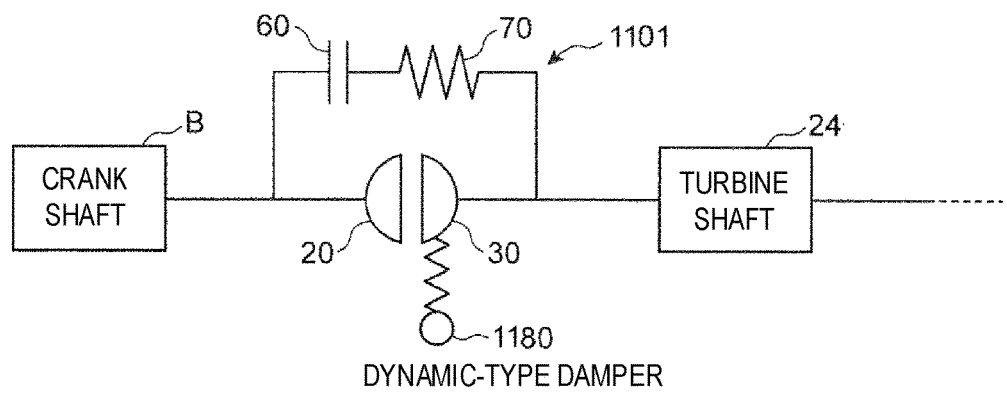
FIG. 18 is a system diagram illustrating a drive force transmission system of a fluid transmission device according to a twelfth embodiment of the present invention.

As illustrated in FIG. 18, the torque converter 1101 includes a dynamic-type damper 1180 as a dynamic vibration absorber. The dynamic-type damper 1180 is at least partially inside a core space H, and in the dynamic-type damper 1180 of this embodiment, a mass body is attached to a turbine core ring 35 of a turbine 30 via an elastic member.

Further, the dynamic-type damper 1180 reduces vibration caused by an engine in both states where a lockup clutch 60 is not engaged and is engaged, and is used as the dynamic vibration absorber in this embodiment. Therefore, as illustrated in FIG. 20, by utilizing a swing of the mass body of the dynamic-type damper 1180, a resonance frequency which occurs in the engine can be shifted outside a normal use range.

Next, a fluid transmission device according to a thirteenth embodiment is described in detail with reference to FIGS. 19 and 20. It will be noted that, since the fluid transmission device 1201 of the thirteenth embodiment is similar to the fluid transmission device 1101 of the twelfth embodiment except that the component to which the dynamic vibration absorber is attached is different, the similar configurations are denoted with the same reference characters and the description thereof is omitted.

Figure 19:
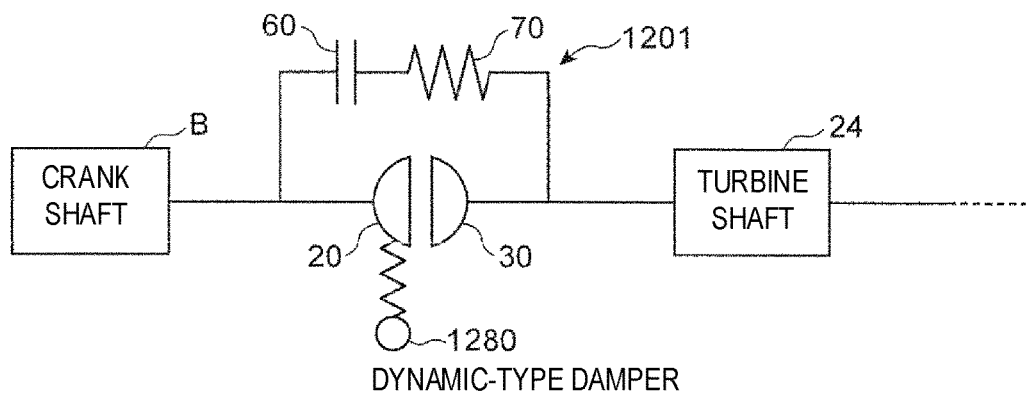
FIG. 19 is a system diagram illustrating a drive force transmission system of a fluid transmission device according to a thirteenth embodiment of the present invention.

As illustrated in FIG. 19, the torque converter 1201 includes a dynamic-type damper 1280 as a dynamic vibration absorber similar to the twelfth embodiment. The dynamic-type damper 1280 is at least partially inside a core space H, and in the dynamic-type damper 1280 of this embodiment, a mass body is attached to a pump core ring 36 of a pump 20 via an elasticmember.

Similarly to the twelfth embodiment, the dynamic-type damper 1280 reduces vibration caused by an engine in both states where a lockup clutch 60 is not engaged and is engaged. As illustrated in FIG. 20, by utilizing a swing of the mass body of the dynamic-type damper 1280, a resonance frequency which occurs in the engine can be shifted outside a normal use range.

As described above, according to the ninth to thirteenth embodiments, the dampers 80, 980, 1080, 1180 and 1280 for reducing the vibration caused by the engine are provided on the respective torque converters 801, 901, 1001, 1101 and 1201 and disposed at least inside the core space H formed by the pump core ring 36 and the turbine core ring 35. Thus, compared to a configuration in which the dampers 80, 980, 1080, 1180 and 1280 are disposed outside the core space, an axial dimension of each torque converter is particularly shortened, and the torque converter can be configured compactly.

Further according to the ninth to thirteenth embodiments, the inside surface facing the core space H is formed in one of the annular-shaped plane surfaces 36a and 35a of the pump and turbine core rings 36 and 35, respectively. By attaching the dampers 80, 980, 1080, 1180 and 1280 to the annular-shaped plane surface 36a or 35a, compared to a configuration in which the core space H having substantially the same width and height is not defined by flat planes but by, for example, a torus-shaped curved surface, a larger core space H can be effectively utilized as accommodation space for the dampers 80, 980, 1080, 1180 and 1280, and the dampers 80, 980, 1080, 1180 and 1280 which vibrate within the core space H can be stably attached to the inside surface.

Further, according to these embodiments, since the pump core ring 36 and the turbine core ring 35 have the inner circumferential parts 36b and 35b extending circumferentially inward while facing each other with a predetermined gap therebetween, similarly to a configuration in which outer circumferential parts extending circumferentially outward are provided, entrance of fluid into the core space H can be suppressed. Moreover, since the inner circumferential parts do not project into the core space H as outer circumferential parts would, an even larger space can be secured as the accommodation space for the dampers 80, 980, 1080, 1180 and 1280.

In the ninth to thirteenth embodiments, the configurations in which the dampers 80, 980, 1080, 1180 and 1280 are respectively used as the dynamic vibration absorber are described; however, the dynamic vibration absorber is not limit to these, and for example, a viscous-type damper may alternatively be used.

The present invention is not limited to the above illustrative embodiments, and without departing from the scope of the present invention, various enhancements and modifications in design can be made.

As described above, according to the present invention, a fluid transmission device including a dynamic vibration absorber can be configured compactly in an axial direction thereof. Thus, the present invention may suitably be utilized in technical fields of manufacturing a fluid transmission device and a vehicle on which the fluid transmission device is mounted.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

What is claimed is:

1. A fluid transmission device, comprising:
   a rotatable case having a rotational axis, coupled to a drive source, and provided therein with a pump shell configured to integrally rotate with the case, and a turbine shell facing a drive source side of the pump shell, a drive force being transmitted between the pump shell and the turbine shell via fluid; and
   a dynamic vibration absorber having a swing body and configured to reduce vibration caused by the drive source,
   wherein the dynamic vibration absorber overlaps with at least one of the pump shell and the turbine shell in an axial direction of the case,
   wherein the dynamic vibration absorber is configured inside the case,
   wherein the dynamic vibration absorber is disposed on an outer circumferential side of the pump shell and the turbine shell,
   wherein an extension part extending on an outer circumferential side of an outer-most circumferential part of the pump shell is configured on an outer-most circumferential part of the turbine shell, and
   wherein the dynamic vibration absorber is coupled to an outer circumferential side of the extension part.

2. The fluid transmission device of claim 1, wherein a bulging part of the pump shell bulges away from the drive source as the pump shell extends circumferentially inward from the outer-most circumferential part thereof, and the case is coupled to the bulging part.

3. The fluid transmission device of claim 2, further comprising:
   a lockup clutch that directly couples the pump shell and the turbine shell to each other; and
   damper springs that reduce the vibration caused by the drive source when the lockup clutch is engaged,
   wherein the damper springs are disposed on an outer circumferential side of the lockup clutch to overlap with the lockup clutch in the axial direction, and also disposed on a drive source side of the dynamic vibration absorber to overlap with the dynamic vibration absorber in radial directions of the case.

4. The fluid transmission device of claim 1, further comprising:
   a lockup clutch that directly couples the pump shell and the turbine shell to each other; and
   damper springs that reduce the vibration caused by the drive source when the lockup clutch is engaged,
   wherein the damper springs are disposed on an outer circumferential side of the lockup clutch to overlap with the lockup clutch in the axial direction, and also disposed on the drive source side of the dynamic vibration absorber to overlap with the dynamic vibration absorber in radial directions of the case.

5. A fluid transmission device, comprising:
   a rotatable case having a rotational axis, coupled to a drive source, and provided therein with a pump shell configured to integrally rotate with the case, and a turbine shell facing a drive source side of the pump shell, a drive force being transmitted between the pump shell and the turbine shell via fluid; and
   a dynamic vibration absorber having a swing body and configured to reduce vibration caused by the drive source,
   wherein the dynamic vibration absorber overlaps with at least one of the pump shell and the turbine shell in an axial direction of the case,
   wherein the dynamic vibration absorber is configured inside the case,
   wherein the dynamic vibration absorber is disposed on an outer circumferential side of the pump shell and the turbine shell,
   wherein an extension part extending on the outer circumferential side of the turbine shell is configured on an outer-most circumferential part of the pump shell, and
   wherein the dynamic vibration absorber is coupled to an outer circumferential side of the extension part.

6. The fluid transmission device of claim 5, wherein a bulging part of the pump shell bulges away from the drive source as the pump shell extends circumferentially inward from the outer-most circumferential part thereof, and the case is coupled to the bulging part.

7. The fluid transmission device of claim 6, further comprising:
   a lockup clutch that directly couples the pump shell and the turbine shell to each other; and
   damper springs that reduce the vibration caused by the drive source when the lockup clutch is engaged,
   wherein the damper springs are disposed on an outer circumferential side of the lockup clutch to overlap with the lockup clutch in the axial direction, and also disposed on the drive source side of the dynamic vibration absorber to overlap with the dynamic vibration absorber in radial directions of the case.

* * * * *